(12) United States Patent
Shirdel et al.

(10) Patent No.: US 10,233,744 B2
(45) Date of Patent: Mar. 19, 2019

(54) METHODS, APPARATUS, AND SYSTEMS FOR STEAM FLOW PROFILING

(71) Applicant: Chevron U.S.A. Inc., San Ramon, CA (US)

(72) Inventors: Mahdy Shirdel, Bakersfield, CA (US); Michael John Wells, Bakersfield, CA (US); Richard Scot Buell, Bakersfield, CA (US); Jackie C. Sims, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 192 days.

(21) Appl. No.: 15/079,612

(22) Filed: Mar. 24, 2016

(65) Prior Publication Data

US 2016/0281494 A1 Sep. 29, 2016

Related U.S. Application Data

(60) Provisional application No. 62/269,740, filed on Dec. 18, 2015, provisional application No. 62/199,068, (Continued)

(51) Int. Cl.
*E21B 47/06* (2012.01)
*E21B 43/24* (2006.01)
(Continued)

(52) U.S. Cl.
CPC ............ *E21B 47/065* (2013.01); *E21B 33/12* (2013.01); *E21B 41/0078* (2013.01);
(Continued)

(58) Field of Classification Search
CPC ......... E21B 47/065; E21B 47/06; E21B 44/00
(Continued)

(56) References Cited

U.S. PATENT DOCUMENTS 6,820,489 B2  11/2004  Fernald et al.
7,350,577 B2   4/2008  Howard et al.
(Continued)

FOREIGN PATENT DOCUMENTS

WO  2005035944  4/2005
WO  2005064297  7/2005
(Continued)

OTHER PUBLICATIONS

Extended European Search Report, dated Aug. 5, 2016, during the prosecution of European Application No. 16162453.1.
Fram, J.H, et al.; "Addressing Horizontal Steam Injection Completions Challenges with Chevron's Horizontal Steam Test Facility"; SPE 132410, (2010), pp. 1-12.

*Primary Examiner* — Anthony Ho

(57) ABSTRACT

Provided herein are systems, methods, and computer-readable medium for profiling steam injected into a formation. In one embodiment, the method includes receiving a dataset of temperature surveillance data, acoustic surveillance data, surface injection data, downhole pressure measurement device data, downhole temperature measurement device data, or any combination thereof. The method further include determining annular temperature profiles, tubing temperature profiles, behind liner temperature profiles, or any combination thereof from the dataset based on configuration of the fiber optic surveillance system in the well and design of the well. The method further includes using flow diagnostic results based on the dataset, the annular temperature profiles, the tubing temperature profiles, etc. to select which computational algorithm(s) can be used to determine a steam injection flow profile and associating each selected algorithm with a weight, executing each selected algorithm, and using results and the associated weight to determine the steam injection flow profile.

26 Claims, 19 Drawing Sheets

Related U.S. Application Data filed on Jul. 30, 2015, provisional application No. 62/138,894, filed on Mar. 26, 2015.

(51) Int. Cl.

| | | |
|---|---|---|
| *E21B 44/00* | (2006.01) | |
| *E21B 33/12* | (2006.01) | |
| *E21B 47/00* | (2012.01) | |
| *G06F 17/11* | (2006.01) | |
| *G06F 17/50* | (2006.01) | |
| *E21B 41/00* | (2006.01) | |
| *E21B 17/00* | (2006.01) | |

(52) U.S. Cl.
CPC .............. *E21B 43/24* (2013.01); *E21B 44/00* (2013.01); *E21B 47/00* (2013.01); *E21B 47/06* (2013.01); *G06F 17/11* (2013.01); *G06F 17/5009* (2013.01); *E21B 17/00* (2013.01); *G06F 2217/16* (2013.01)

(58) Field of Classification Search
USPC .......................................................... 702/6
See application file for complete search history.

(56) References Cited

U.S. PATENT DOCUMENTS

| | | |
|---|---|---|
| 8,109,340 B2 | 2/2012 | Doane et al. |
| 9,022,119 B2 | 5/2015 | Sims |
| 9,127,539 B2 | 9/2015 | Maier et al. |
| 9,518,438 B2 | 12/2016 | Sun et al. |
| 9,551,201 B2 | 1/2017 | Ring et al. |
| 9,874,432 B2 | 1/2018 | Spross |
| 2009/0182509 A1 | 7/2009 | Kimminau et al. |
| 2016/0281456 A1 | 9/2016 | Sims et al. |
| 2016/0281471 A1 | 9/2016 | Buell et al. |
| 2016/0312552 A1* | 10/2016 | Early .................. G05B 13/041 |
| 2017/0089192 A1* | 3/2017 | Rendusara .......... E21B 47/0007 |

FOREIGN PATENT DOCUMENTS

| | | |
|---|---|---|
| WO | 2008142585 | 11/2008 |
| WO | 2010123566 | 10/2010 |
| WO | 2014158333 | 10/2014 |

\* cited by examiner

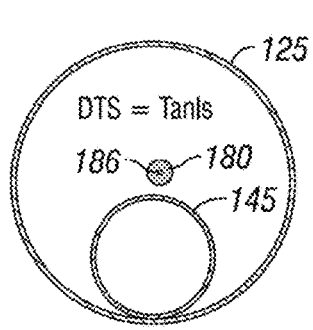
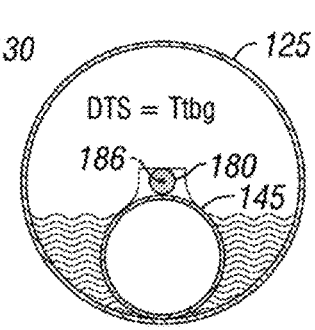
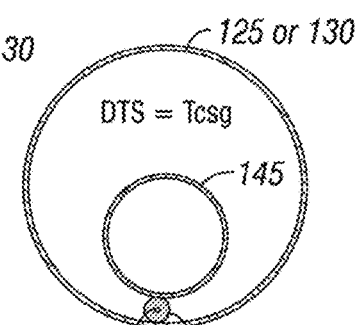
FIG. 3A-1   FIG. 3A-2   FIG. 3A-3
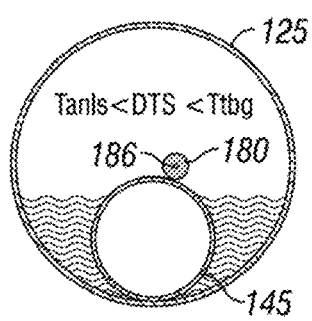
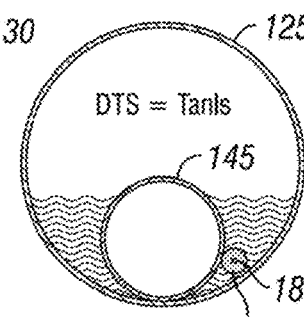
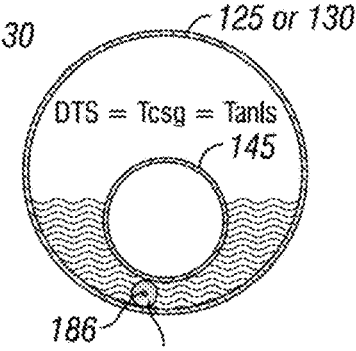
FIG. 3A-4   FIG. 3A-5   FIG. 3A-6
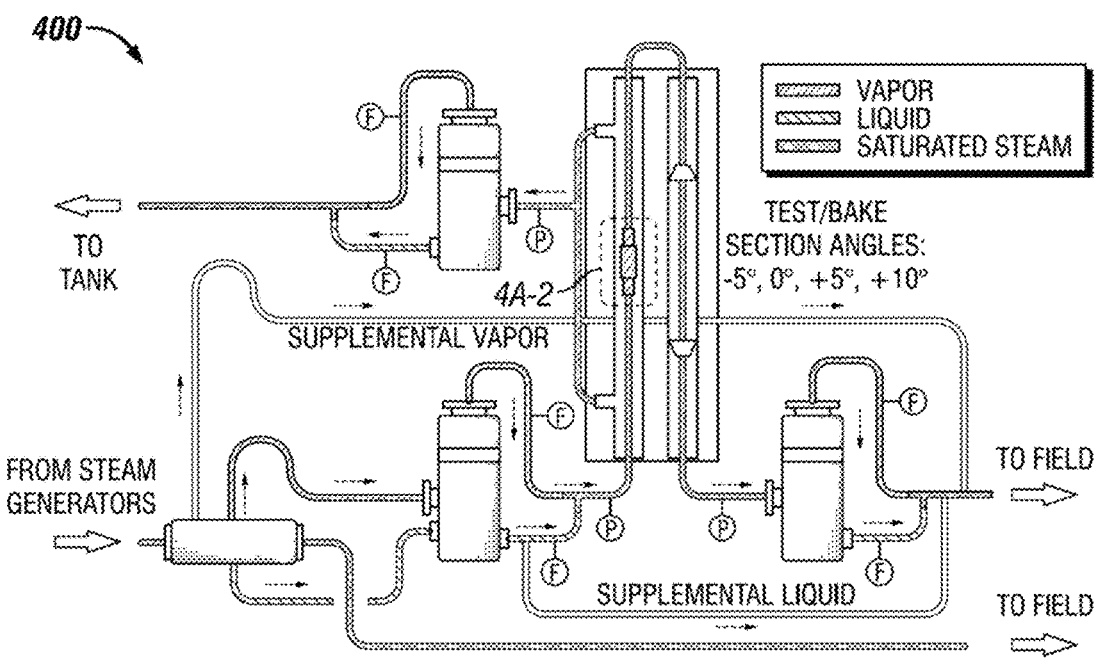
FIG. 4A-1

| ALGORITHMS | SEGMENT #1 | SEGMENT #2 | SEGMENT #3 | SEGMENT #4 | SEGMENT #5 | WEIGHT |
|---|---|---|---|---|---|---|
| STEADY STATE THERMAL HYDRAULIC MODEL | 20% | 16% | 13% | 19% | 32% | 1 |
| EARLY TRANSIENT COOLING DTS | 14% | 10% | 14% | 28% | 34% | 0.6 |
| LATE TRANSIENT COOLING DTS | 14% | 14% | 18% | 19% | 35% | 1 |
| POWER SPECTRAL DENSITY | 11% | 18% | 18% | 21% | 32% | 1 |
| WATERFALL ANALYSIS | NA | NA | NA | NA | 32% | 0 |
| STEAM INJECTION FLOW PROFILE | 15% | 15% | 16% | 21% | 33% | |
| PROFILE CONFIDENCE VALUE | 93% | | | | | |
| PROFILE COEFFICIENT OF VARIATION | 19% | | | | | |
| PROFILE COEFFICIENT OF SKEWINESS | -0.13 | | | | | |

*FIG. 6*

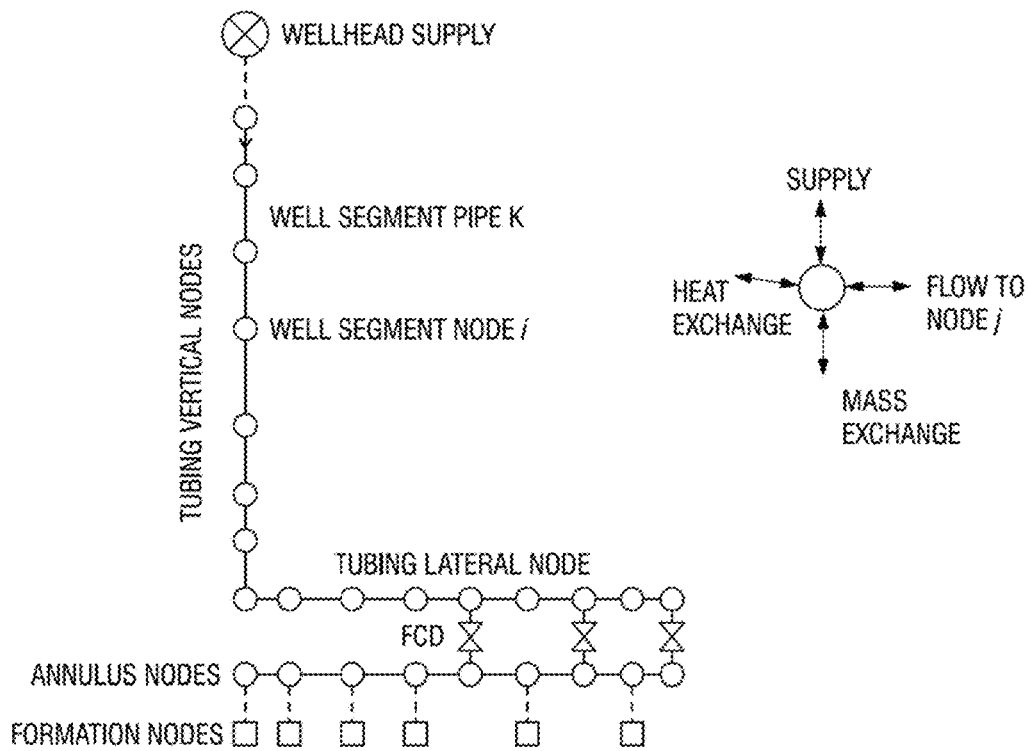

*FIG. 7*

METHODS, APPARATUS, AND SYSTEMS FOR STEAM FLOW PROFILING

CROSS REFERENCES TO RELATED APPLICATIONS

This application claims benefit under 35 USC 119 of U.S. Provisional Patent App. No. 62/138,894 with a filing date of Mar. 26, 2015, which is incorporated herein by reference in its entirety and for all purposes. This application claims benefit under 35 USC 119 of U.S. Provisional Patent App. No. 62/199,068 with a filing date of Jul. 30, 2015, which is incorporated herein by reference in its entirety and for all purposes. This application claims benefit under 35 USC 119 of U.S. Provisional Patent App. No. 62/269,740 with a filing date of Dec. 18, 2015, which is incorporated herein by reference in its entirety and for all purposes.

TECHNICAL FIELD

The present disclosure relates to methods, systems, and apparatuses for steam injection for hydrocarbon recovery. More particularly, the present disclosure relates to methods, systems, and apparatuses for developing steam injection flow profiles.

BACKGROUND

Steam flooding, as a thermal enhanced oil recovery (EOR) process, has been introduced in heavy (5°-20° API) oil fields to increase recovery factors in relatively shallow and depleted formations. Heavy oils always have high viscosities that are 100 cp or greater. Steam, through its latent heat, reduces the viscosity of the oil and makes the oil moveable toward the production wellbores, through recovery mechanisms such as gravity drainage.

In thermal hydrocarbon production steam flooding operations, steam is typically generated above the ground and may be used to provide steam to one or several wells (e.g., injection wells, production wells undergoing cyclic steaming, etc.) at once. A plurality of tubulars (e.g., conduits) are installed within each well to deliver steam into the hydrocarbon bearing formation. Tubulars are inclusive of casing, liner, tubing, and conductor which are all different sizes of pipes for different oilfield wellbore applications. The wells may have a vertical, inclined, horizontal, or combination trajectories to deliver steam to the formation. Flow control devices are deployed in the plurality of tubulars to distribute steam. There are two primary methods of distributing steam for heat and flow conformance control: 1) tubing-deployment and 2) liner or casing deployment.

Tubing deployment (1) has flow control devices integrally connected to the tubing and the tubing is always deployed inside casing or liner. For tubing deployment, steam exits the tubing via a tubing deployed flow control device(s) and enters the tubing-liner annulus. After entering the tubing-liner annulus, the steam then passes through the liner and enters the openhole or formation. Packers may be used with tubing deployment to direct and control the steam movement into the formation.

Liner or casing deployment (2) has flow control devices integrally connected to the liner or casing, and the liner and casing is deployed in openhole. For liner or casing deployment, steam is delivered with open-ended tubing (i.e. without flow control devices) into the liner or casing. Steam exits the liner or casing via a liner or casing deployed flow control device(s) and enters the openhole or formation.

The flow control devices support uniform distribution of heat from the tubing into either the tubing-liner-annular space or formation. A plurality of packers may also be installed on the tubulars to effect hydraulic isolation of various wellbore segments in either the tubing-liner annulus or the liner-openhole annulus. The intent of this hydraulic isolation is the improvement of heat delivery uniformity to the wellbore-formation interface.

Many factors can negatively affect the function of the steam injection system. For example, flow control devices with large outside diameters increase friction and drag forces when inserting or pulling the tubing in a wellbore, which in turn, may increase the likelihood that the tubing and completion hardware will get stuck in a horizontal section of a wellbore (e.g., due to sand, scale, asphaltenes, etc.) and damaged due to being stuck. As another example, packers may not provide an effective hydraulic seal and may not be able to direct the steam to the targeted portion of the formation or wellbore. Non-uniform heating can substantially impact the economics of the field development, oil production response, and create non-uniform steam breakthrough in the production wellbores. As another example, the steam injectors inject the steam at high temperatures, which may result in sand influx and clogging, low cycle fatigue, and packer and liner hanger deterioration. Diagnosis of equipment integrity is crucial to ensure the reliability and integrity of the steam injection system. Furthermore, steam conformance control in the steam injection and cyclic steam stimulation wellbores is crucial for formation heat management in heavy oil fields.

Fiber optic based surveillance technology has been used by the oil and gas industry since the early 90s to try and uncover and address some of the aforementioned items in a timely manner. However, despite the improvements in underlying Distributed Temperature Sensing (DTS) and Distributed Acoustic Sensing (DAS) technology, success continues to be limited due to a variety of challenges and deficiencies in existing solutions, which include, but are not limited to: (1) conventional flow profiling algorithms that do not properly take into account the complex nature of the multi-phase steam flow and heat transfer behavior in the wellbore and formation associated with steam injection (e.g., algorithms based on Joules Thompson effect); (2) different algorithms, based on different physical assumptions (e.g., acoustic, temperature, etc.) that calculate different flow profiles with no robust way to confidently determine the most likely flow profile; (3) inability to robustly diagnose conditions in the wellbore and performance of the associated steam injection conformance control equipment; and (4) surveillance systems that require overly complex fiber optic systems that add complexity and risk to the operation of the field.

Thus, there continues to be a need for an improved manner of steam injection flow profiling.

SUMMARY

In one aspect, provided herein is an embodiment of a computer implemented method for profiling steam injected into a formation. In one embodiment, the method includes receiving a dataset of temperature surveillance data, acoustic surveillance data, surface injection data, downhole pressure measurement device data, downhole temperature measurement device data, or any combination thereof for steam injection in a well. The temperature surveillance data and the acoustic surveillance data are derived from a fiber optic surveillance system in the well. The method further includes determining annular temperature profiles, tubing temperature profiles, behind liner temperature profiles, or any combination thereof from the dataset based on configuration of the fiber optic surveillance system in the well and design of the well. The method further includes using flow diagnostic results based on the dataset, the annular temperature profiles, the tubing temperature profiles, behind the liner temperature profiles, flow loop data, non-fiber optics surveillance data, or any combination thereof to select which computational algorithm or computational algorithms from a set of computational algorithms can be used to determine a steam injection flow profile for the steam injection and associating each selected algorithm with a weight. The method further includes executing each selected algorithm and using results from each executed algorithm and the associated weight to determine the steam injection flow profile for the steam injection.

In one aspect, provided herein is an embodiment of an apparatus for profiling steam injected into a formation. In one embodiment, the system includes a processing unit and a memory communicatively connected to the processing unit. The memory storing instructions which, when executed by the processing unit, cause the system to perform a method of profiling steam injected into a formation. The method includes receiving a dataset of temperature surveillance data, acoustic surveillance data, surface injection data, downhole pressure measurement device data, downhole temperature measurement device data, or any combination thereof for steam injection in a well. The temperature surveillance data and the acoustic surveillance data are derived from a fiber optic surveillance system in the well. The method further includes determining annular temperature profiles, tubing temperature profiles, behind liner temperature profiles, or any combination thereof from the dataset based on configuration of the fiber optic surveillance system in the well and design of the well. The method further includes using flow diagnostic results based on the dataset, the annular temperature profiles, the tubing temperature profiles, behind the liner temperature profiles, flow loop data, non-fiber optics surveillance data, or any combination thereof to select which computational algorithm or computational algorithms from a set of computational algorithms can be used to determine a steam injection flow profile for the steam injection and associating each selected algorithm with a weight. The method further includes executing each selected algorithm and using results from each executed algorithm and the associated weight to determine the steam injection flow profile for the steam injection.

In one aspect, provided herein is an embodiment of a computer-readable medium having computer-executable instructions stored thereon which, when executed by a computing system, cause the computing system to perform a method of profiling steam injected into a formation. The method includes receiving a dataset of temperature surveillance data, acoustic surveillance data, surface injection data, downhole pressure measurement device data, downhole temperature measurement device data, or any combination thereof for steam injection in a well. The temperature surveillance data and the acoustic surveillance data are derived from a fiber optic surveillance system in the well. The method further includes determining annular temperature profiles, tubing temperature profiles, behind liner temperature profiles, or any combination thereof from the dataset based on configuration of the fiber optic surveillance system in the well and design of the well. The method further includes using flow diagnostic results based on the dataset, the annular temperature profiles, the tubing temperature profiles, behind the liner temperature profiles, flow loop data, non-fiber optics surveillance data, or any combination thereof to select which computational algorithm or computational algorithms from a set of computational algorithms can be used to determine a steam injection flow profile for the steam injection and associating each selected algorithm with a weight. The method further includes executing each selected algorithm and using results from each executed algorithm and the associated weight to determine the steam injection flow profile for the steam injection.

DESCRIPTION OF THE DRAWINGS

FIGS. 3A-1, 3A-2, 3A-3, 3A-4, 3A-5, and 3A-6 illustrate cross-sectional views of example locations of the capillary tubing of FIG. 1B relative to a tubing and a casing or liner for a tubing deployed fiber optic surveillance system.

FIGS. 4A-1, 4A-2, and 4B illustrate one embodiment of a horizontal steam injection test facility.

FIG. 5 illustrates one embodiment of a method of steam injection flow profiling.

FIG. 6 illustrates an example steam injection flow profile that may be determined.

FIG. 7 is a schematic view of one example of a tubing deployed well completion.

DETAILED DESCRIPTION

Terminology

Figure 1A:
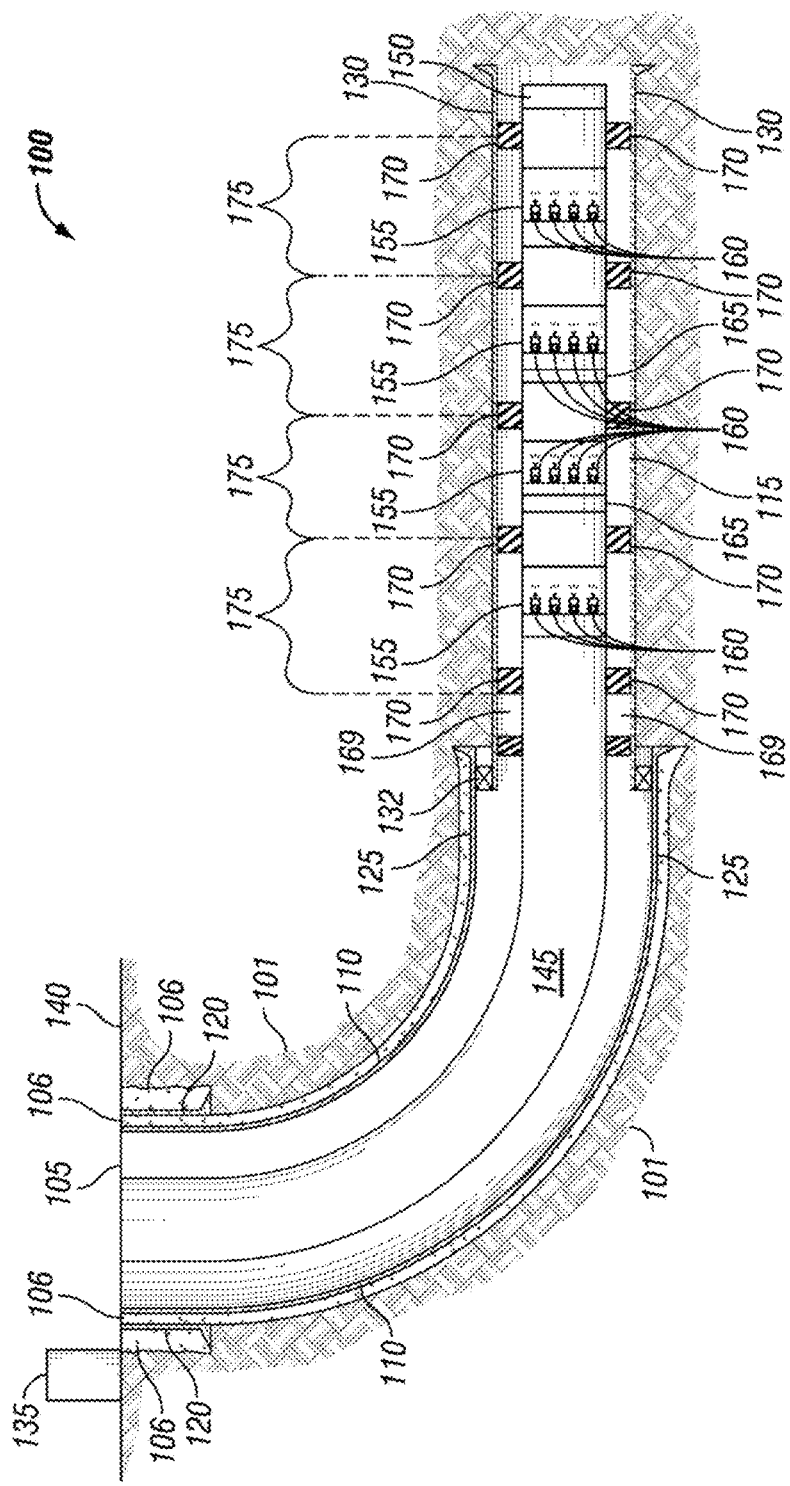
FIG. 1A illustrates one embodiment of a steam injection system.

The following terms will be used throughout the specification and will have the following meanings unless otherwise indicated.

"Steam" refers to a two-phase mixture of water in liquid and vapor (gas) phases. The term steam is not limited to only two-phase mixtures and includes (a) single phase water vapor, (b) single phase liquid, and (c) vapor with additional solvents, chemicals, additives, compounds, or any combination thereof.

"Conformance" refers to the degree of the uniformity of a profile, for example, the degree of uniformity of steam injection or heat distribution into the formation.

"Formation" refers to the rock matrix in which a wellbore is present. For example, a formation refers to a body of rock that is sufficiently distinctive and continuous such that it can be mapped. The formation may include hydrocarbons such as heavy oil or other hydrocarbons. It should be appreciated that while the term "formation" generally refers to geologic formations of interest, that the term "formation," as used herein, may, in some instances, include any geologic points or volumes of interest (such as a survey area). The term formation is not limited to any structure and configuration described herein. The term formation may be used synonymously with the term reservoir.

"Wellbore" refers to a single hole for use in hydrocarbon recovery. The wellbore can be used for injection, production, or both. The wellbore may include casing, liner, tubing, conductors, or any combinations thereof. The wellbore may include an openhole portion or uncased portion. The wellbore is surrounded by the formation. The wellbore may have vertical, inclined, horizontal, or combination trajectories. The wellbore may include any completion hardware that is not discussed separately. The term wellbore is not limited to any structure and configuration described herein. The term wellbore may be used synonymously with the terms borehole or well.

"Openhole" refers to the uncased portion of a wellbore. All wells, at least when first drilled, have openhole sections. While most completions are cased, some are open, especially in horizontal or extended-reach wells where it may not be possible to cement casing efficiently.

"Casing" as used herein refers to steel pipe cemented in place during the construction process to stabilize the wellbore. The casing forms a major structural component of the wellbore and serves several important functions: preventing the formation wall from caving into the wellbore, isolating the different formations to prevent the flow or crossflow of formation fluid, and providing a means of maintaining control of formation fluids and pressure as the wellbore is drilled. The casing can include one or more casing strings, such as a surface casing string and a production casing string within the surface casing string. Casings for heavy oil may have many perforations to allow production fluids to enter from the formation into the wellbore or to allow exit of injected steam from the wellbore to the formation. Casings provide perforations for production or injection while excluding sand production from the wellbore. The term casing is not limited to any structure and configuration described herein.

"Liner" as used herein refers to any string of casing in which the top does not extend to the surface but instead is suspended from inside the previous casing string. Many conventional wellbore designs include a production liner set across the formation interval. Liners for heavy oil may have many apertures to allow production fluids to enter from the formation into the wellbore or to allow exit of injected steam from the wellbore to the formation. Liners provide apertures for production or injection while excluding sand production from the wellbore. In short, a liner refers to any mechanical device suitable for being lowered into a wellbore and may contain one of the following: (a) slots with a controlled aperture dimension cut in pipe, (b) screens with a controlled aperture dimension mounted between perforated based pipe and an outer protective shroud, (c) wire and ribs welded on perforated base pipe with a controlled aperture dimension, or (d) stainless steel wool media mounted between a perforated base pipe and an outer protective outer shroud. The liner creates an annular ring that is between the tubing and formation, or within the wellbore between the tubing and formation for injecting steam to the formation. The term liner is not limited to any structure and configuration described herein.

"Tubing" as used herein refers to any structure suitable for being lowered into a casing or a liner, for the purpose of producing fluids from the formation and/or distributing fluids into the formation. For the purpose of steam injection, the tubing is made up of a plurality of tubulars (e.g., tubing joints, pup joints, packers, flow control devices, etc.) connected together. The term tubing is not limited to any structure and configuration described herein. The term tubing may be used synonymously with the term tubing string.

"Flow control device (FCD)" as used herein is a device that can bifurcate a flow of steam and has four basic components: 1) connection at one end (e.g., female threaded connection), 2) connection at the other end (e.g., male threaded connection), 3) an internal path to allow steam to flow through the flow control device, and 4) one or more exit paths equipped with chokes, nozzles, holes, or ports to control the flow (e.g., of steam) from the inside of the flow control device to the outside. The flow control device may be practically any device that can bifurcate a flow of steam. The term flow control device is not limited to the structure and configuration described herein.

"Temperature Observation Wellbore (TOW)" refers to a wellbore drilled to allow monitoring of temperatures, pressures, and fluid distributions, including steam at certain points in the formation. The term TOW is not limited to the structure and configuration described herein.

"Optical" refers to both visible and non-visible spectrum, and optical radiation includes infrared radiation and ultraviolet radiation. The term optical is not limited to the structure and configuration described herein.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a second component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a second component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a second component (e.g., optionally one or more components of type B).

Unless defined otherwise, all technical and scientific terms used herein have the same meanings as commonly understood by one of skill in the art to which the disclosed invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

Provided herein are embodiments for steam injection flow profiling. The embodiments herein provide a way to quantitatively determine with high confidence a steam injection flow profile for steam injected into a formation using. a multi-physics approach based on independent physical principles derived from steady state and transient multiphase flow, thermal hydraulic models, acoustic effects, large data array processing, and combinations of the foregoing methods. The high-confidence steam injection flow profiles are determined based upon convergence of multiple computational algorithms using an approach that works robustly with liner, casing and tubing deployed fiber optic surveillance and conformance control systems. The embodiments provided herein disclose flow diagnostic tools, the acoustic energy spectrum, and steam flow regime models that may be used to understand steam injection conformance design integrity.

Those of ordinary skill in the art may appreciate that when a steam injection flow profile is determined with high confidence, the profile can be used to identify corrective actions to achieve more uniform heating of the formation through redistributing steam to different portions of the formation. Without a high confidence flow profile, it can be difficult or impossible to identify the appropriate corrective action. Corrective actions may include installing packers during a workover to redirect or shut-off steam, moving, adding, or removing FCDs, changing nozzles in FCD(s), altering the length of the tubing to inject to a specified target, changing the steam injection rate and quality, using sliding sleeves to open up or shut off steam to some portion of the formation, etc. Moreover, evaluation of the corrective action to improve steam delivery uniformity can be confirmed with steam injection flow profiling. In addition to more uniform heating, this corrective action can prevent steam breakthrough occurring between the injection wellbore and the production wellbore, which prevents the wasteful short circuiting of steam through the formation without the benefit of efficient oil recovery. In one example, the steam injected flow profile that is determined may be used to optimize steam injection rate, flow, distribution, or any combination thereof through one or more wellbores into the wellbore of interest.

Well and Conformance Design

In enhanced thermal recovery processes employing steam as the heating medium, it is desirable to know the steam injection flow profile. A steam injection flow profile is defined as quantifying the mass of steam vapor and liquid moving from the wellbore into the formation for each segment of the wellbore. A wellbore segment that is being flow profiled always has a hydraulic flow path at the interface between wellbore and formation which is typically provided by openhole, slots, perforations, wire wrapped screens, premium screens, etc. The definition of a wellbore segment is unique to each wellbore but can be as short as 10 feet up to several hundred feet in length. For example, a wellbore segment may be a length of the wellbore between two sets of packers installed in the steam injection portion of the wellbore and includes all components within the two sets of packers. Alternatively, some wellbores do not include packers in the steam injection portion of the wellbore, and therefore, a wellbore segment may be a particular length of the wellbore in the steam injection portion of the wellbore and all components in that particular length.

Knowing the steam injection flow profile allows the actual heat delivery to be calculated for each segment of the wellbore-formation interface. The actual heat being delivered to each portion of the formation is important for optimization and determining the efficiency of the thermal recovery process. It is generally desirable to have uniform heat delivery at the wellbore-formation interface which is quantified in BTU/ft for each wellbore segment. Due to formation heterogeneity and well completion effects (e.g., residual mud, skin, fines migration, etc.), non-uniform steam heat delivery occurs often. An example of suboptimal non-uniform heat delivery would be a few portions of the formation taking all steam injection while the majority of the portions of the formation are receiving little or no steam. Steam injection flow profiling enables this sub-optimal heat delivery to be identified and corrected. Moreover, evaluation of corrective actions to improve heat delivery uniformity can be confirmed with steam injection flow profiling. In addition to more uniform heating, this corrective action can prevent steam breakthrough occurring between the injection wellbore and the production wellbore, which prevents the wasteful short circuiting of steam through the formation without the benefit of efficient oil recovery.

Steam injection flow profiling in injection and production wellbores is a key step for evaluating the uniformity of the heat distribution. Non-uniform heating of the formation, breakthrough of water, gas, or steam in a minority of wellbore segments, or both can substantially impact the economics of the field development. Embodiments of well completion architecture design that accommodates a robust surveillance capability are disclosed herein.

In thermal hydrocarbon production operations, steam is generated above the ground and may be used to provide steam to one or several wells (e.g., injection wells, production wells undergoing cyclic steaming, etc.) at once. A plurality of tubulars (e.g., conduits) are installed within each well to deliver steam into the hydrocarbon bearing formation. Tubulars are inclusive of casing, liner, tubing, and conductor which are all different sizes of pipes for different oilfield wellbore applications. The wells may have a vertical, inclined, horizontal or combination trajectories to deliver steam to the formation. Flow control devices are deployed in the plurality of tubulars. There are two primary methods of distributing steam for heat and flow conformance control: 1) tubing-deployment and 2) liner or casing deployment (reference appropriate figures already provided).

Tubing deployment (1) has flow control devices integrally connected to the tubing with male and female threads and the tubing is always deployed inside casing or liner. For tubing deployment, steam exits the tubing via a tubing deployed flow control device(s) and enters the tubing-liner annulus. After entering the tubing-liner annulus, the steam then passes through the liner and enters the openhole or formation. Packers may be used with tubing deployment to direct and control the steam movement into the formation.

Liner or casing deployment (2) has steam flow control devices integrally connected to the liner or casing, and the liner and casing is deployed in openhole. For liner or casing deployment, steam is delivered with open-ended tubing (i.e. without steam flow control devices) into the liner or casing. Steam exits the liner or casing via a liner or casing deployed flow control device and enters the formation or openhole.

The flow control devices support uniform distribution of heat from the tubing into either the tubing-liner-annular space or formation. A plurality of packers may also be installed on the tubulars to effect hydraulic isolation of various wellbore segments in either the tubing-liner annulus or the liner-openhole annulus. The intent of this hydraulic isolation is the improvement of heat delivery uniformity to the wellbore-formation interface.

Examples of flow control devices that can be used in tubing deployment are disclosed in U.S. Pat. Nos. 7,350,577 and 9,022,119, which are incorporated herein by reference. An example of a low profile flow control device that can be used in tubing deployment, and a mixer with internal crisscross threading, is discussed in U.S. Non-Provisional patent application Ser. No. 15/080,199 filed with the same title and on the same date as the present disclosure, which is incorporated herein by reference in its entirety.

Examples of flow control device that can be used in liner or casing deployment may be the following commercially available flow control devices: Absolute Completion Technologies' Premium Port, Baker Hughes' Equalizer, Halliburtons' Equalizer, and RGL's FCJ, PCJ, and SCP. Of note, laboratory investigations in the horizontal steam injection test facility have confirmed that non-uniform phase splitting or wet steam can occur. Correction and improvement of this non-uniform phase splitting can be improved (or corrected) with the mixer with internal crisscross threading incorporated by reference herein. This mixer with internal crisscross threading improves phase splitting of wet steam for both liner-deployed and tubing-deployed flow control devices. The mixer with crisscross threading could be deployed upstream of the following commercially available liner deployed flow control devices: Absolute Completion Technologies' Premium Port, Baker Hughes' Equalizer, Halliburtons' Equalizer, and RGL's FCJ, PCJ, and SCP. The mixer with crisscross threading improves phase splitting of wet steam for horizontal, inclined, and vertical wellbore geometries.

Examples of packers that can be used are disclosed in U.S. Pat. No. 8,109,340 and US Patent Publication Nos. 2014/0196914, 2014/0041858, and 2013/0160996, which are all incorporated herein by reference in their entirety. An example of a packer with a primary sealing element and a secondary sealing element that can be used is discussed in U.S. Non-Provisional patent application Ser. No. 15/080,194 filed with the same title and on the same date as the present disclosure, which is incorporated herein by reference in its entirety.

FIG. 1A illustrates one embodiment of a steam injection system. The steam injection system 100 includes a wellbore 105 drilled into a formation 101 with a vertical section 110 and a horizontal section 115. The wellbore 105 is also cemented as illustrated by cement 106. The area between the vertical section 110 and the horizontal section 115 is generally referred to as the heel and the area towards the end of the horizontal section 115 is generally referred to as the toe.

The system 100 includes a surface casing 120 along a portion of the wellbore 105, a production casing 125 along a portion of the wellbore 105, and a liner 130 (e.g., a slotted liner) attached by at least one liner hanger 132. The system 100 includes at least one steam injector 135 at a surface 140. The system 100 also includes a tubing 145 within the surface casing 120, the production casing 125, and the liner 130, which starts at the surface 140. The tubing 145 may be of standard sizes known in the industry (e.g., outermost diameter of 2⅜ inches to 4.5 inches) for standard and commonly known casing sizes (e.g., outermost diameter of 4½ inches to 12 inches), each of which have lengths in the tens to hundreds of feet. The end of the tubing 145 (e.g., at the toe) includes a bull plug 150.

The tubing 145 includes a plurality of tubulars such as flow control devices, tubing joints, pup joints, packers (e.g., may include centralizers), etc. For example, the tubing 145 may include at least one flow control device, such as low profile FCD 155, an FCD that is not low profile, or any combination thereof. Each low profile FCD 155 may include at least one nozzle 160 or plug. As illustrated, a set of four nozzles 160 may be in a single low profile FCD 155. Alternatively, multiple sets of four nozzles 160 may be in a single low profile FCD 155 (e.g., eight nozzles in a single low profile FCD 155). Also, the nozzles 160 may be around the circumference of the low profile FCD 155 instead of the parallel arrangement illustrated in FIG. 1A. Those of ordinary skill in the art will appreciate that other embodiments of the low profile FCD 155 may include more than or fewer than four nozzles. For example, some other embodiments of the low profile FCD 155 are possible, such as those incorporated by reference herein.

At least one mixer 165 may be coupled to a flow control device, such as the low profile FCDs 155. For example, the mixer 165 may be a conventional mixer (e.g., a conventional static mixer), the static mixer with internal crisscrossed threading incorporated by reference herein, or any combination thereof. For example, the mixer 165 improves the phase split uniformity of wet steam. Steam phase split uniformity is defined as having less than 15 quality units difference between the inlet and outlet qualities.

A plurality of packers 170 may be located in an annulus 169 between the tubing 145 and the liner 130. The packers 170 may be conventional packers or conventional cup packers, the packers with primary sealing elements and secondary sealing elements incorporated by reference herein, or any combination thereof. The plurality of packers 170 may create a plurality of wellbore segments 175, and each wellbore segment 175 includes each flow control device, mixer, or other component within that wellbore segment 175. The definition of a wellbore segment is unique to each wellbore, but it can be as short as 10 feet up to several hundred feet in length.

In operation, a volume of steam from the steam injector 135 may enter the tubing 145 at the surface 105 and the steam is injected into the adjacent formation 101 according to the characteristics of each wellbore segment 175. For example, starting from the heel, a portion of the volume of steam may enter the first low profile FCD 155 and that portion of the volume of steam exits the respective nozzles 160 of the first low profile FCD 155 to flow through perforations in the liner 130 to the adjacent formation 101 per the characteristics of that first wellbore segment 175. Similarly, a portion of the volume of steam flows through the mixer 165 that is coupled to the second low profile FCD 155, exits the mixer 165, enters the second low profile FCD 155, exits the respective nozzles 160 of the second low profile FCD 155, and flows through slots in the liner 130 to the adjacent formation 101 per the characteristics of that second wellbore segment 175, and so on.

Of note, FIG. 1A is not drawn to scale and various modifications may be available, for example, the wellbore 105 may be a vertical wellbore, the wellbore 105 may have a different components or quantity of components than those illustrated in FIG. 1A, or the liner or casing may include conventional FCDs such as those commercially available from Weatherford, Schlumberger, Absolute, and Halliburton to name a few. For example, the steam injection system 100 may include a capillary tubing to house at least one optical fiber to be discussed further starting at FIG. 1B.

Fiber Optic Surveillance System

The fiber optic surveillance system is designed based on the configuration of the wellbore, the type of the wellbore, and the surveillance and conformance control plans. For an existing wellbore, the optical fibers can only be installed inside the liner or casing on the tubing or coiled tubing. However, for a new drilled wellbore, optical fibers can be installed either inside or outside the liner or casing with trade-offs between cost, risk, flow profiling accuracy, and flow diagnostic capabilities determining the preferred approach.

There are many methods to install fiber optic surveillance systems into wellbores for surveillance purposes. The first design choice is to select a permanent, pumpable, or a temporary deployable fiber optic surveillance system. A pumpable system allows the optical fibers to be recovered and replaced should they experience hydrogen darkening. A pumpable system requires two capillary tubes to enable the pumping fluid to be pumped down the capillary tube and returned to surface. The viscous drag force of the pumped fluid on the optical fiber enables recovery and replacement of optical fibers. A turnaround sub with a U-tube geometry is required at the deepest wellbore placement of the fiber optic surveillance system to join the two capillary tubes and enable pumping. The pumping of optical fiber can occur in a factory, controlled surface environment, or at the wellsite with optical fibers in the wellbore. Pumpable systems are typically limited to one or two optical fibers.

A permanent optical fiber is typically installed inside a capillary tube in factory or surface control environment. Permanent systems may have many optical fibers installed within the capillary tube and could include multimode optical fibers, single mode optical fibers, fiber Bragg grating arrays, and optical pressure gauges. If a permanent optical fiber becomes damaged due to hydrogen darkening or thermal degradation, the only recourse is a complete replacement of the system. The permanent and pumpable system can strap or clamp the fiber optic capillary tube to the outside of casing, liners, and tubing or they can be installed inside a coiled tubing instrument tube.

A temporary deployable fiber optic surveillance system is run into a wellbore off a reeling system into the tubing or into a coiled tubing instrument tube. The coiled tubing instrument tube could be free hanging in the tubing-casing annulus or strapped to the tubing, casing, or liner. The temporary deployable fiber optic surveillance system has small diameter FIMT (fiber in metal tube) with an outside diameter of 0.09 to 0.15 inches which is reinforced with fiber glass, polyproylene, polyethylene, carbon fiber, and combinations of the foregoing which encases and protects the FIMT. This temporary deployable fiber optic system is designed to be run in and out of many wellbores and is typically installed for a few hours to a few weeks to acquire surveillance data.

The following sections describe the main elements of fiber optic surveillance system design and the potential applications of various installation schemes.

Capillary Tubing:

At least one conduit in the wellbore, e.g., a metal tubing, is to house the optical fibers (hereinafter "capillary tubing"). The capillary tubing houses at least one optical fiber, with each optical fiber including one or more sensing points at various locations along the optical fiber. Those fibers may include, but are not limited to: a single mode fiber used for distributed acoustic sensing ("DAS"), a multi-mode fiber used for distributed temperature sensing ("DTS"), and at least one pressure or temperature measurement device.

In one embodiment, multiple capillary tubings may be employed, with each capillary tubing containing one or more optical fibers. In another embodiment, a single capillary tubing is used, which contains a plurality of optical fibers, including at least a distributed acoustic sensing fiber and at least a distributed temperature sensing fiber.

Besides the plurality of optical fibers, the capillary tubing in one embodiment is filled with a fluid, e.g., a hydrogen scavenging gel, an inert heat transfer fluid, or an inert gas. In one embodiment, the filling fluid is a gel designed to scavenge hydrogen and protect the optical fiber from hydrogen darkening. The gel also helps to support the weight of the optical fiber(s) within the capillary tubing. In another embodiment, the capillary tubing is filled with an inert gas such as nitrogen to avoid exposure of the optical fibers to water or hydrogen, thereby minimizing any hydrogen-induced darkening of the optical fibers during oilfield operations.

Figure 1B:
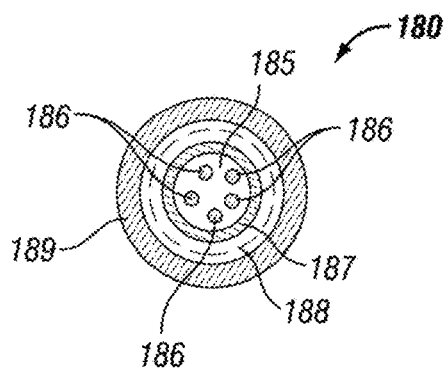
FIG. 1B is a cross-sectional view of one embodiment of a capillary tubing for the containment of at least one optic fiber for use in the steam injection system of FIG. 1A.

FIG. 1B illustrates a cross-sectional view of one embodiment of a capillary tubing 180, which can be installed in various locations in the steam injection system 100 of FIG. 1A. Those of ordinary skill in the art will appreciate that there are other capillary tubing designs, and the appended claims are not limited to any disclosed embodiments. The capillary tubing 180 may have a length of tens of feet to hundreds of feet. In some embodiments, the capillary tubing 180 may be practically the entire length of the wellbore 105. The outer diameter of the capillary tubing 180 may be about ⅛ inches to about ⅜ inches. The outer diameter of the capillary tubing 180 may be about ¼ inches.

Starting from the inside, the capillary tubing 180 includes a core 185 comprised of a first protective layer that is typically of an Inconel® or Incoloy® alloy 25, a stainless steel, or any combination thereof with at least one optical fiber 186 inside the core 185. As an example, a plurality of optical fibers 186 typically have high temperature coatings and coating combinations, including polyimide, high temperature acrylates, silicone-PFA, hermetic carbon, or any combination thereof to prevent hydrogen darkening. The core 185 may be filled with fluid, and the fluid surrounds each optical fiber 186. The fluid may be a gel or inert gas as discussed hereinabove. The inner diameter of the core 185 may be about 0.05 inches to about 0.10 inches. The combination of the first protective layer and the optical fiber is commonly referred to as a FIMT or fiber in metal tube. The length of the core 185 depends on the length of the capillary tubing 180.

Adjacent to the core 185 may be an optional second protective layer 187, which may be of a metallic material such as aluminum. The diameter of the second protective layer 187 is optional and often not used for thermal applications because of differential thermal expansion, but may be about 0.10 inches to about 0.20 inches. The length of the second protective layer 187 depends on the length of the capillary tubing 180.

Adjacent to the optional second protective layer 187 may be a third protective layer 188, which may be of a metallic material (e.g., Inconel® or Incoloy® alloy 25, a stainless steel, or any combination thereof). The diameter of the third protective layer 188 may be about 0.20 inches to about 0.40 inches. The length of the third protective layer 188 depends on the length of the capillary tubing 180.

Adjacent to the third protective layer 188 may be an encapsulation protective layer 189, which is typically an extruded encapsulation polymer (e.g., polyethylene, polypropylene, Teflon™ brand, Hypalon™ brand, or any combination thereof). The diameter of the encapsulation protective layer 189 may be about 0.25 inches to about 0.75 inches. The length of the encapsulation protective layer 189 depends on the length of the capillary tubing 180. Encapsulation layers are rarely used for thermal service because the majority of the encapsulation polymers perform poorly at steam temperatures, exceptions are Teflon, Aflas, and Hypalon.

Distributed Temperature Sensing (DTS) System:

In one embodiment, a DTS system is provided for DTS sensing as part of a fiber optic surveillance system. The DTS system comprises a fiber (hereinafter multimode DTS fiber), and the multimode DTS fiber may be a double-ended or single-ended multi-mode optical fiber. One optical fiber 186 of capillary tubing 180 in FIG. 1B may be the multimodal DTS fiber. The DTS system also comprises a DTS interrogation box connected to the multimodal DTS fiber at the surface. A DTS interrogator containing a laser launches pulses of light into the multimodal DTS fiber. As the light passes through the multimode DTS fiber, some light is reflected back as the pulse encounters impurities in the multimode DTS fiber.

One component of the backscattered light is known as Raman scattering. Raman scattering is reflected light, which has been shifted in wavelength above and below the wavelength of the incident light. Raman light has two components known as stokes and anti-stokes. Raman sensing systems can have relatively slow response times (e.g., on the order of several seconds), and spatial resolution on the order of centimeters. The Raman scattering intensity of the anti-stokes component is much more sensitive to changes in temperature than the stokes component. By examining the differences in pulse timing, stokes, and anti-stokes intensities, the DTS interrogator can generate the temperature surveillance data. It should be recognized that the multimodal DTS fiber is a continuous sensor in space. Based upon interrogator configuration, the spatial sampling, temporal sampling, temperature accuracy, and resolution can be adjusted. One meter spatial sampling with 0.01° C. resolution is typically available from commercial interrogators. Other scattering methods can be employed, e.g., Brillouin scattering which induces a Doppler frequency shift of the scattered light.

In one embodiment, the DTS interrogator uses pulses of light from a laser source at wavelengths between 1300 to 1550 nanometers. The light pulses are transmitted into the multimodal DTS fiber many times per second at precise time intervals. The DTS interrogator receiver section then looks for the reflected and wavelength shifted pulses returning from the multimodal DTS fiber. The time relationship between the incident pulses and returning pulses along with the amplitude of the returning pulses are used to calculate the temperature along the entire length of the multimodal DTS fiber.

The DTS system is described herein as a source of temperature surveillance data (sometimes referred to as DTS data); however, one skilled in the art will recognize that other sources of temperature surveillance data could be used in addition to, or instead of, the DTS system. The terminology "DTS system" is used herein for simplicity, but the DTS system is not limited to any configuration provided herein, and, for example, may include practically an array of digital temperature sensors, thermocouples, Fiber Bragg Grating (FBG) sensing systems, any other multi-point, quasi-distributed, or distributed temperature sensing system, etc. Accordingly, the temperature surveillance data may be obtained or received from the DTS system, and any light scattering technique can be used for obtaining or receiving the temperature surveillance data including Raman scattering, Brillouin scattering, Rayleigh scattering, etc. The temperature surveillance data may be used for profiling steam injected into the formation.

Distributed Acoustic Sensing (DAS) System:

A DAS system is used for DAS sensing as part of a fiber optic surveillance system, whereby a single length of longitudinal fiber (hereinafter DAS fiber) is optically interrogated by one or more input pulses, to provide substantially continuous sensing of vibrational activity along its length. The DAS fiber may be either single-mode or multimode, but single-mode is the preferred fiber. One optical fiber 186 of capillary tubing 180 in FIG. 1B may be the DAS fiber. The DAS system also comprises a DAS interrogation box connected to the DAS fiber at the surface. The term "acoustic" shall be taken to mean any type of mechanical vibration or pressure wave, including seismic waves and sounds from sub-Hertz to 20 KHz. Optical pulses are launched into the DAS fiber and the radiation backscattered from within the DAS fiber is detected and analyzed. Rayleigh backscattering analysis is used to quantify vibration, seismic waves, or sound.

By analyzing the radiation backscattered within the DAS fiber, the DAS fiber can effectively be divided into a plurality of discrete sensing portions which may be (but do not have to be) contiguous. Within each discrete sensing portion, mechanical vibrations of the DAS fiber, for instance from acoustic sources, cause a variation in the amount of Rayleigh backscatter from that portion. This variation can be detected and analyzed and used to give a measure of the acoustic spectrum intensity of disturbance of the DAS fiber at that sensing portion.

Besides the intensity (amplitude) and distance, other factors that can be measured include frequency, phase, duration, and signal evolution of the transients. Additionally, a steam injection flow profile determined by the methodologies herein may comprise the acoustic noise generated by the flow of steam into the formation.

In one embodiment, the single length of DAS fiber is single mode fiber, and is preferably free of any mirrors, reflectors, gratings, or (absent any external stimulus) any change of optical properties along its length, i.e. absent any designed optical variation along its length. This provides the advantage that an unmodified, substantially continuous length of standard fiber can be used, requiring little or no modification or preparation for use.

The DAS system is described herein as a source of acoustic surveillance data (sometimes referred to as DAS data); however, one skilled in the art will recognize that other sources of acoustic surveillance data could be used in addition to, or instead of, the DAS system. The terminology "DAS system" is used herein for simplicity, but the DAS system is not limited to any configuration provided herein, and, for example, may include practically geophones, hydrophones, acoustic logging, any combination thereof, etc. Accordingly, the acoustic surveillance data may be obtained or received from the DAS system, and any backscattering technique can be used for obtaining or receiving the acoustic surveillance data including Rayleigh backscattering, geophones, hydrophones, acoustic logging, any combination thereof, etc. The acoustic surveillance data may be used for profiling steam injected into the formation.

Optional Downhole Pressure or Downhole Temperature Measurement Devices:

In one embodiment, a fiber optic surveillance system may include one or more downhole pressure measurement device. A downhole pressure measurement device may be a pressure transducer, which may include a sensing element such as one or more FBGs or one or more Fabry-Perot sensors. For example, examples of downhole pressure measurement devices are provided in U.S. Publication No. 2013/0120756 and U.S. Pat. No. 6,820,489, both of which are incorporated herein by reference in their entirety.

The downhole pressure measurement device is described herein as a source of downhole pressure measurement device data; however, one skilled in the art will recognize that other sources of downhole pressure measurement device data could be used in addition to, or instead of, the downhole pressure measurement device. The terminology "downhole pressure measurement device" is used herein for simplicity, but the downhole pressure measurement device is not limited to any configuration provided herein, and, for example, may include quartz, sapphire, Bourdon tube transducers, any combination thereof, etc. Accordingly, the downhole pressure measurement device data may be obtained or received from the downhole pressure measurement device. The downhole pressure measurement device data may be used for profiling steam injected into the formation.

In one embodiment, a fiber optic surveillance system may include at least one temperature measurement device. A downhole temperature measurement device may be a digital temperature sensor, thermocouple, Fiber Bragg Grating (FBG) sensing system, any other multi-point, quasi-distributed, or distributed temperature sensing system, any combination thereof, etc.

The downhole temperature measurement device is described herein as a source of downhole temperature measurement device data; however, one skilled in the art will recognize that other sources of downhole temperature measurement device data could be used in addition to, or instead of, the downhole temperature measurement device. The terminology "downhole temperature measurement device" is used herein for simplicity, but the downhole temperature measurement device is not limited to any configuration provided herein, and, for example, may include practically digital temperature sensors, thermocouples, Fiber Bragg Grating (FBG) sensing systems, any other multi-point, quasi-distributed, or distributed temperature sensing system, any combination thereof, etc. Accordingly, the downhole temperature measurement device data may be obtained or received from the downhole temperature measurement device. The downhole temperature measurement device data may be used for profiling steam injected into the formation.

In some embodiment, the fiber optic surveillance system may include downhole pressure measurement device(s) only. In some embodiment, the fiber optic surveillance system may include downhole temperature measurement device(s) only. In some embodiment, the fiber optic surveillance system may include both downhole pressure measurement device(s) and downhole temperature measurement device(s). In some embodiment, a downhole pressure measurement device and a downhole temperature measurement device may be separate devices in the fiber optic surveillance system. Alternatively, in some embodiment, a downhole pressure measurement device and a downhole temperature measurement device may be combined in a single device in the fiber optic surveillance system. An option is a sensor that can be installed in wellbores such as the SolarOptic™ Gauge available from Halliburton. Accordingly, there are various options available for the structure of these measurement devices.

Each downhole pressure measurement device, each downhole temperature measurement device, and each combination device may be installed practically anywhere in the wellbore, such as anywhere in the wellbore 105 of FIG. 1A. In some embodiments, these measurement devices are installed within or proximate to steam injection zones, such as the steam injection zones 175 of FIG. 1A that are located between the heel and toe in FIG. 1A. The measurement devices may, or may not, be part of the capillary tubing 180 of FIG. 1B depending on the embodiment.

Capillary Tubing Installation Schemes:

A variety of installation schemes are presented herein for a capillary tubing of a fiber optic surveillance system, such as the capillary tubing 180 of FIG. 1B. In one embodiment, the capillary tubing is attached to the outer surface of the tubing with a plurality of clamps, or any known method for coupling conduits. Further, in some embodiments, it should be appreciated that the capillary tubing need not be coupled to the tubing, but it can be coupled to any other conduits in the wellbore or the casing/liner itself, or it can be integral with the casing/liner, e.g., the capillary tubing can be positioned in the annulus, clamped/strapped/fastened to any of the tubing, inside the tubing, the liner, the casing, the instrument coiled tubing, or any combination thereof. The installation scheme that is chosen may depend upon whether the wellbore is new or preexisting, components of the wellbore, etc.

FIGS. 2A-1, 2B-1, 2C-1, and 2D-1 illustrate various capillary tubing installation schemes. One could consider FIGS. 2A-1, 2B-1, 2C-1, and 2D-1 to be simplified views of FIG. 1A with a focus on the capillary tubing 180. FIGS. 2A-2, 2B-2, 2C-2, and 2D-2 illustrate various cross-sectional views of the capillary tubing 180 and other components.

Figures 1, 2A:
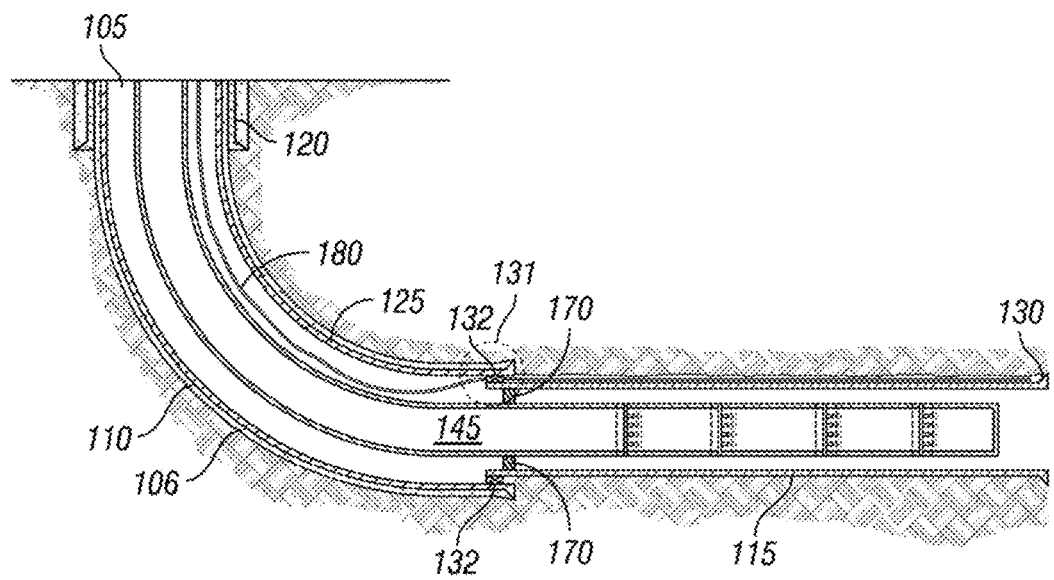
FIGS. 2A-1, 2A-2, 2B-1, 2B-2, 2C-1, 2C-2, 2D-1, and 2D-2 illustrate various capillary tubing installation schemes.
Figures 2, 2A:
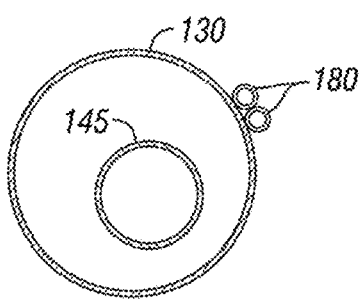

Capillary Tubing Clamped to Liner:

FIGS. 2A-1 and 2A-2 illustrate an embodiment with a hydraulic wet connect at liner top 131 with the capillary tubing 180 being clamped to the tubing 145 above the liner top 131. There can be one or more of the capillary tubing 180 in the fiber optic surveillance system, depending on whether it is a permanent or pump-able fiber optic surveillance system. This installation scheme is suitable for steam injection in horizontal sections of wellbores.

In the embodiment of FIGS. 2A-1 and 2A-2, the capillary tubing 180 may be installed outside of the liner 130 in the horizontal section of the wellbore 105, and clamped on the tubing 145 in the vertical section 105. The fiber 186 of FIG. 1B (e.g., the multimodal DTS fiber, the DAS fiber, etc.) can be permanently installed in the capillary tubing 180 or can be pumped and retrieved through pumping system to/from the capillary tubing 180. A hydraulic wet connect is used to connect the fiber 186 in the horizontal section 115 and the vertical clamped section 110. The tubing 145 can be run in and out of the wellbore without damaging the fiber 186 in the horizontal section 115. In one embodiment, this installation scheme allows the DTS fiber to sense the fluid temperature in the formation vicinity and eliminates the influence of thermal coupling with other objects (e.g., the tubing 145) in the annulus. In this installation, the DAS fiber picks up the noise or vibration of the fluid flow through the perforated portion of the liner 130. In this configuration, DAS and DTS surveillance data provides quantitative indicators about steam movement from the wellbore 105 into the formation 101. Areas of the liner 130 that have high or low steam flow paths can be identified. It is noted that in this installation, the DAS fiber has minimal sensing of the tubing 145's flow noise in the horizontal section 115, which is advantageous. This setup may include at least one packer 170.

Figures 1, 2B:
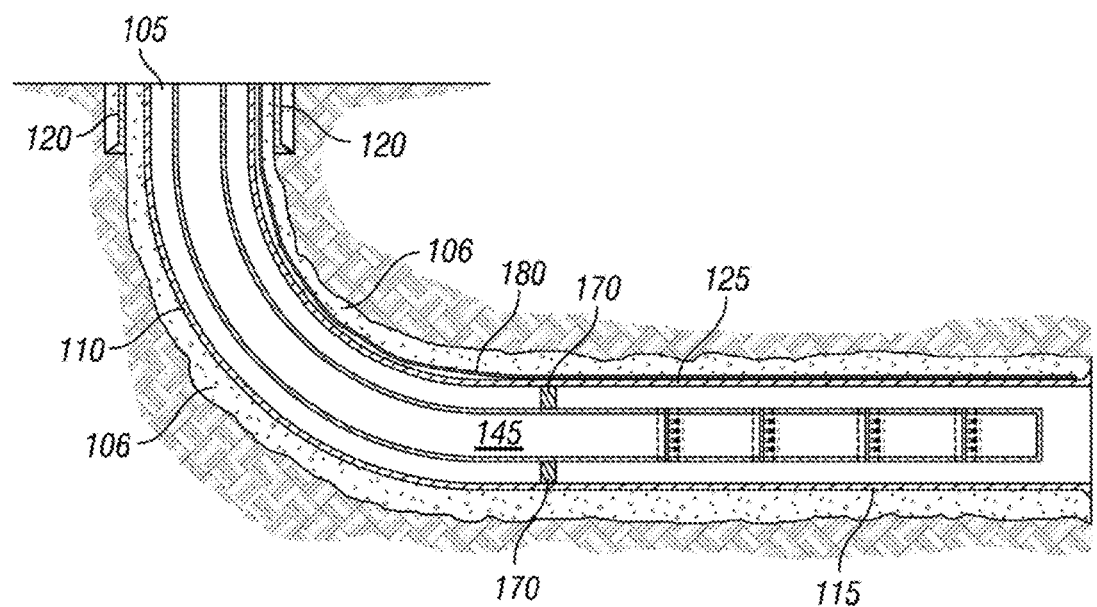
Figures 2, 2B:
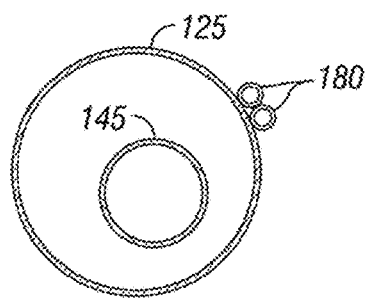

Capillary Tubing Clamped to Casing:

FIGS. 2B-1 and 2B-2 illustrate an embodiment in which the capillary tubing 180 can also be clamped to the casing, such as the production casing 125. Additionally, there can be one or more of the capillary tubing 180 depending on whether it is a permanent or pump-able fiber optic surveillance system.

The installation scheme of FIGS. 2B-1 and 2B-2 is similar to the liner deployed surveillance scheme of FIGS. 2A-1 and 2A-2. As shown, the complete system is installed outside of the casing 125. The capillary tubing 180 is clamped to the casing 125 as the casing 125 is installed into the wellbore 105. Fiber 186 can be retrieved and replaced when designed as a pump-able system. In another embodiment, a single capillary tubing 180 can be run with single or multiple permanent optical fibers 186. In the horizontal section of the casing 125, the DTS and DAS fiber measures the temperature and acoustic noise at vicinity of formation similar to the liner 130 deployed scheme. In the vertical section 110, this installation scheme allows more information (e.g., temperature and noise) from the formation vicinity to be sensed. It should be recognized that when a capillary tubing 180 in clamped to casing 125, the perforations that are made in the casing 125 to create at least one flow path from the wellbore 105 to the formation 101 should not damage the capillary tubing 180. Standard practice is to shoot perforations 180 degrees away from the capillary tubing 180. The capillary tubing 180 is normally run with ½ inch steel cables on either side of the ¼ inch capillary tubing 180 to facilitate electromagnetic orienting of perforating guns. This setup may include at least one packer 170.

Figures 1, 2C:
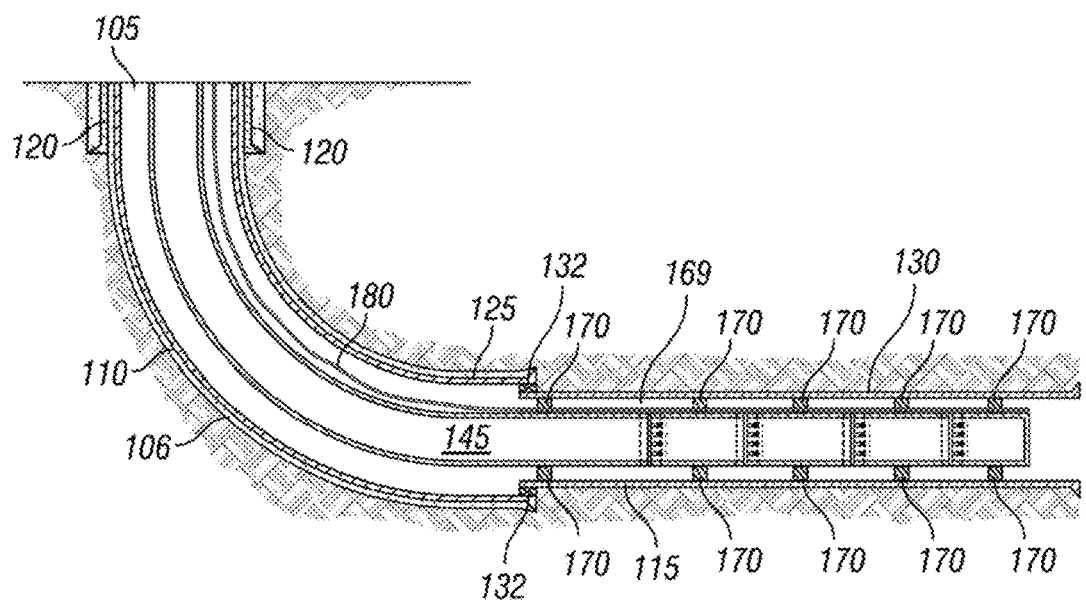
Figures 2, 2C:
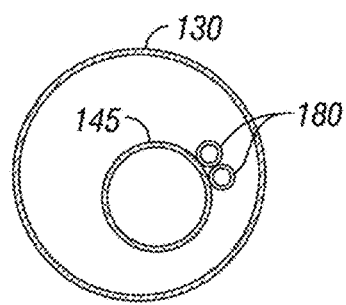

Capillary Tubing Clamped to Tubing:

FIGS. 2C-1 and 2C-2 illustrate an embodiment in which the capillary tubing 180 can also be clamped to the tubing 145, with one or more of the capillary tubing 180 depending on whether it is a permanent or pump-able fiber optic surveillance system. In one embodiment of this scheme, the capillary tubing 180 is only clamped on the tubing 145.

In another embodiment, the capillary tubing 180 and the fiber 186 can be installed inside the tubing 145 to monitor the flow inside the tubing 145.

The installation scheme in this setup is flexible, which facilitates the changes in the fiber 186 design and specifications. Additionally, the fiber 186 and capillary tubing 180 are retrievable. This installation method makes the fiber 186 to be sensitive to changes inside the wellbore 105, e.g., flow regimes and turbulence, thermal coupling, and fluid flow cooling/warming due to heat transfer within the wellbore 105.

This setup may include at least one packer 170. Furthermore, in this setup, the capillary tubing may penetrate through the packers 170. Penetration is discussed further in U.S. Non-Provisional patent application Ser. No. 15/080,199 filed with the same title and on the same date as the present disclosure, which is incorporated herein by reference in its entirety.

Figures 1, 2D:
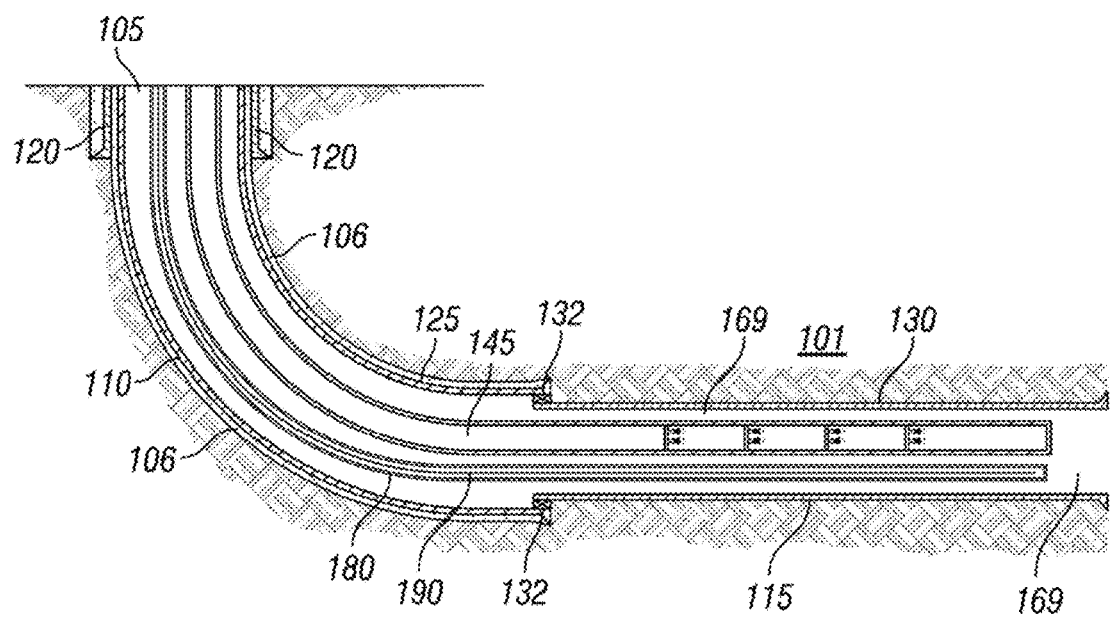
Figures 2, 2D:
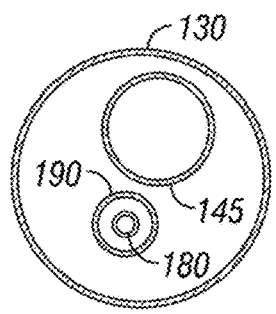

Capillary Tubing Inside Instrument Coiled Tubing:

FIGS. 2D-1 and 2D-2 illustrate an embodiment in which the capillary tubing 180 can also be positioned within an instrument coiled tubing 190, and there can be one or more of the capillary tubing 180 depending on whether it is a permanent or pump-able fiber optic surveillance system.

In one embodiment, the scheme of FIGS. 2D-1 and 2D-2 is used as a temporary surveillance method (e.g., for a few days) so there is less chance of fiber degradation and capillary tubing corrosion. In another embodiment, the scheme works best with a larger size of liner 130 or casing 125 to avoid damage to the fiber 186 and sticking in the wellbore 105. The scheme of FIGS. 2D-1 and 2D-2 is flexible, allowing retrieval of fiber 186/capillary tubing 180. Capillary tubing and injection tubing thermal coupling (clamping effects) are diminished. This scheme of FIGS. 2D-1 and 2D-2 allows relatively simple data interpretation compared to other schemes (e.g. tubing deployed). DAS data will mainly show the noise inside the wellbore 105 such as flow regime turbulence and nozzles noise, and DTS data will mainly show the temperature inside the wellbore 105. This setup may not include any packers 170.

Capillary Tubing Location Affects:

The location of the capillary tubing 180 may affect the data that is obtained from the optical fiber(s) in the capillary tubing 180. In particular, FIGS. 3A-1, 3A-2, 3A-3, 3A-4, 3A-5, and 3A-6 illustrate cross-sectional views of example locations of the capillary tubing 180 relative to the tubing 145 and the casing 125/the liner 130 for a tubing deployed fiber optic surveillance system. The cross-sectional views can be at the horizontal section 115 of the wellbore 105. The curvy lines outside of the tubing 145 and within the casing 125/the liner represent fluid, such as water. The empty space outside of the tubing 145 and within the casing 125/the liner 130 represents vapor. "DTS" refers to the DTS fiber. "Tanls" refers to temperature of annulus. "Ttbg" refers to temperature of tubing. "Tcsg" refers to temperature of casing (or liner)

For example, in FIGS. 3A-1, 3A-2, 3A-3, 3A-4, 3A-5, and 3A-6, the illustrated optical fiber 186 in the capillary tubing is a DTS fiber, and the temperature surveillance data may be affected by the location of the capillary tubing 180. In FIG. 3A-1, the DTS fiber is not touching the tubing 145 because the capillary tubing 180 buckled and created a gap between the capillary tubing 180 and the tubing 145, as such, the DTS fiber may primarily sense the temperature of the annulus (i.e., DTS=Tanls). In FIG. 3A-2, the DTS fiber is touching the tubing 145 (e.g., because the capillary tubing 180 is clamped to the tubing 145), as such, the DTS fiber may primarily sense the temperature on surface of the tubing 145 (i.e., DTS=Ttbg). In FIG. 3A-3, the DTS fiber is touching the casing 125/the liner 130, as such, the DTS fiber may primarily sense the temperature of the surface of the casing 125/the liner 130 (i.e., DTS=Tcsg). In FIG. 3A-4, the DTS fiber may sense temperatures between the annulus and the tubing 145 (i.e., Tanls<DTS<Ttbg). In FIG. 3A-5, the DTS fiber may sense temperatures of the annulus (i.e., DTS=Tanls). In FIG. 3A-6, the DTS fiber may sense temperatures of the casing 125/the liner 130 and the annulus (i.e., DTS=Tcsg=Tanls).

The DTS fiber can sense different temperatures with slight changes in the location of the capillary tubing 180 and fluid type around the capillary tubing 180 containing the DTS fiber due to thermal coupling and heat transfer effects. Hence, a separation technique should be applied to the temperature surveillance data to estimate the temperature profiles at specific locations (e.g., tubing surface, annulus, and formation) before doing flow profiling analysis.

Steam Injection Flow Profiling

Figure 5:
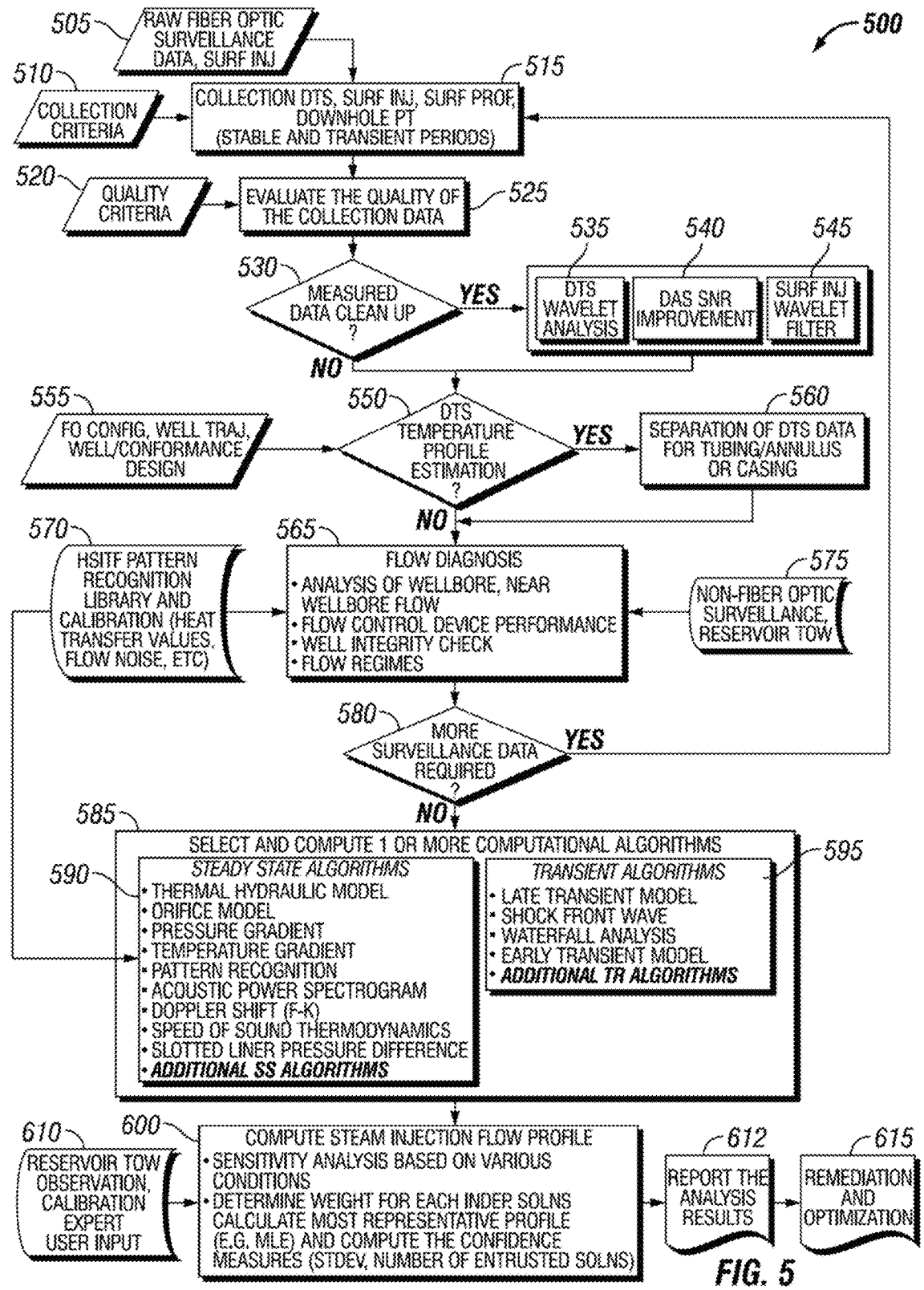

FIG. 5 illustrates one embodiment of a method of steam injection flow profiling. The method 500 may be executed by the computing system 1700 of FIG. 17. The method 500 may receive user input at some points. At 505, the method 500 may receive raw fiber optic surveillance data, surface injection data, etc. For example, at 505, the method may receive temperature surveillance data, acoustic surveillance data, surface injection data, downhole pressure measurement device data, downhole temperature measurement device data, or any combination thereof for steam injection in a well bore, which is explained further herein below.

Data

Different types of data may be used to generate the steam injection flow profile. Some data may be numerical, some data may be alphanumeric, some data may be contradictory, etc. The data may be dynamic or static. The data may be streaming. Some of the data may be received directly from components (e.g., components in the wellbore 105). Some of the data may be based on analysis (e.g., analysis from an engineer or human user). Moreover, some of the data may be received by the computing system 1700 in FIG. 17. For example, at least some of the data may be received in real time or near real time. Alternatively, at least some of the data may be obtained by a vendor, and the computing system 1700 may receive the data from the vendor or via data entry. Some of the data is discussed further herein. However, those of ordinary skill in the art will appreciate that various options for the data may be possible.

Temperature Surveillance Data:

In one embodiment, the temperature surveillance data may be the temperature values that are collected at predetermined points in time (e.g., every 30 sec (average)) along the wellbore 105 from the surface 140 to the end of optical fiber 186 (e.g., DTS fiber) in the wellbore 105. For example, the temperature surveillance data may be stored in LAS format or Excel format for the acquisition period. Examples of temperature surveillance data include measured depth with predefined spatial resolution from a reference point, the date and time of the recording with predefined frequency and temperature of the fluid (e.g., steam, water or oil) for each recording point in space and time, etc.

Acoustic Surveillance Data:

In one embodiment, the acoustic surveillance data is interpreted as acoustic noise and vibration around the optical fiber 186 (e.g., DAS fiber) installed in the wellbore 105. The acoustic surveillance data is collected within a certain sampling frequency (e.g., 12 KHz) to effectively capture the flow noise behavior in a wide range of frequencies (e.g., 0.3-6000 Hz) along the wellbore 105 from the surface 140 to the end of fiber 186 in the wellbore 105 or in the steam injection portion of the wellbore 105. For example, the acoustic surveillance data is collected and may be stored in .segy, a hierarchy data format (.hdf5), or vendor specific format for the acquisition period. Examples of acoustic surveillance data include the data sample format, the data sampling frequency, date and time of the acquisition for each sample, measured depth location with predefined channel length resolution from a reference point, the acoustic noise intensity and phase generated by any fluid movement in the wellbore 105 or formation 101 or any other vibrational deformation and movements around the DAS fiber for each recording time and channel, etc.

Surface Injection Data:

In one embodiment, the surface injection data, such as steam rate, steam quality, and steam pressure is measured. This surface injection data is used to calculate the magnitude of injected heat and other pertinent data for the steam injection flow profiling.

Production Data:

In one embodiment, the well production data, such as oil, water, hydrocarbon gas, steam rate, water oil ratio, gas oil ratio, wellhead pressure, and wellhead temperature, are measured for a production wellbore stimulated by cyclic steam injection (CSS). This production data may be used to perform the profiling of a CSS wellbore during a production period and understand the effectiveness of steam injection and response on hydrocarbon production.

Downhole Pressure Measurement Device Data:

In one embodiment, at least one downhole pressure measurement device is installed at a pre-defined location to record the fluid pressure. The measured pressure data can be indirectly used to calibrate the measured steam temperature data from DTS fiber using the steam saturation pressure and temperature relationship. Additionally, the measure pressure data may be used to help validate the calculated steam injection flow profile).

Downhole Temperature Measurement Device Data:

In one embodiment, at least one downhole temperature measurement device is installed at a pre-defined location to record the fluid temperature around the device. The measured temperature data is used to calibrate the measured temperature data from DTS fiber.

Temperature Observation Wellbore (TOW) Data:

In one embodiment, a temperature observation wellbore (TOW) is used to monitor the steam chest growth and temperature change in the formation 101. TOW data is an indication of the conformance control in the wellbore 105. This TOW data can be used by a user (e.g., engineer) to validate the steam injection flow profile that is determined.

Data Collection Criteria

The method 500 may use collection criteria at 510 to collect a dataset at 515. The collection criteria may be used to receive a subset of the raw data at 505. For example, the dataset at 515 is collected based on collection criteria at 510 from a prior dataset at 505 of temperature surveillance data, acoustic surveillance data, surface injection data, downhole pressure measurement device data, downhole temperature measurement device data, or any combination thereof. As another example, the dataset at 515 is collected based on collection criteria 510 from a prior dataset at 505 for stable periods, transient periods, or any combination thereof.

Those of ordinary skill in the art may appreciate that a large amount of data may be gathered from the fiber optic surveillance system at 505, and collection criteria at 510 may be used to select several stable and transient periods at 515 from the large amount of data for the steam injection flow profiling. The collection criterion may be based on statistical analysis of the surface injection data, such as downstream pressure and rate. The collection criterion may also be based on statistical variation of temperature surveillance data. For example, a stable period may be selected when the injection pressure moving average standard deviation is below a threshold (e.g., 2 psi). For transient periods, either injection start-up or injection shut-down may be considered. Additionally, transient periods exhibiting time windows in which injection steam quality changes suddenly, or steam injection rate and pressure changes periodically, instances in which steam surface injection pressure fluctuates in a manner that creates thermal slugs, or detectable transient behaviors may be selected for steam injection flow profiling. In steam injection, the surveillance data typically has many fluctuations. Hence, both stable and transient periods may be used for various flow profiling algorithms (at 585 of the method 500).

Those of ordinary skill in the art may also appreciate that the collection criteria can also be used for data size reduction and data management purposes. Working with large data matrices can be computationally very expensive. Hence, selecting time windows that can robustly replicate the flow behavior for the entire acquisition time will have substantial impact on reducing the processing time. Additionally, there will be no need to store the entire raw dataset if appropriate time windows are selected. The collection criteria for transient and stable periods can be provided by users (e.g., engineers or can be automatically determined by a computing system).

Data Quality Criteria

The method 500 may use data quality criteria at 520 to evaluate at 525 the data quality of the dataset collected at 515. In one embodiment, the data quality criteria relates to checking that the surface injection data has been received completely (e.g., are there any data interruptions). The data quality criteria also relates to ensuring that the surface injection data is not fluctuating significantly (e.g., the surface injection data is within a certain standard deviation or the surface injection data is consistent with the same threshold as the collection criteria) for steam injection flow profiling. The data quality criteria also includes checking that the temperature surveillance data or the acoustic surveillance data are below their respective predefined signal noise ratio (SNR) value. For example, if any of the temperature surveillance data or the acoustic surveillance data is above the corresponding predefined SNR value, then that temperature surveillance data or that acoustic surveillance data may need to be reprocessed or rejected.

Data Clean Up

Whether or not data cleanup should be performed at 530 of the method 500 on the dataset collected at 515 depending on the evaluation at 525. For example, a portion of the dataset that does not meet a data quality criteria may be cleaned using at least one cleanup algorithm. The cleanup algorithm comprises a DTS wavelet cleanup algorithm, a DAS SNR cleanup algorithm, a surface injection wavelet cleanup algorithm, or any combination thereof.

Those of ordinary skill in the art may appreciate that background noise and operational variation noise can be captured in the temperature surveillance data or the acoustic surveillance data. De-noising that data before using it for steam injection flow profiling is beneficial if any of the temperature surveillance data or the acoustic surveillance data are above the corresponding predefined SNR value. For example, once a wavelet transform is applied to data, the high frequency features, which are related to the noise in the data, are filtered and the basic fundamental features of the data remain in the outcome. Thus, after data collection, a data quality check may be performed to improve the signal to noise ratio.

Regarding the DTS wavelet cleanup algorithm, at 535, wavelet analysis may be performed for de-noising the temperature surveillance data to smooth out the variations of the temperature surveillance data while keeping the most useful information in the temperature surveillance data. This wavelet analysis chooses the right wavelet methods and filtering coefficients to achieve a desirable level of de-noising of the temperature surveillance data. Using the raw temperature surveillance data without de-noising may introduce a large error in the interpretation if it is aimed to be applied for inverse modeling and history matching the temperature surveillance data.

Regarding the DAS SNR cleanup algorithm, at 540, signal processing algorithms, such as data filtering algorithms, may also be applied to improve the signal to noise ratio of the acoustic surveillance data. In frequency domain, the unrequired features can be filtered using low-pass, high-pass, or notch filter design. Although the acoustic surveillance data can be transferred to the frequency domain using Fast Fourier Transform algorithms and be smoothed out using a median filter. In another embodiment, Independent Component Analysis (ICA) or Principle Component Analysis (PCA) algorithms can be used to find the underlying pattern of the acoustic surveillance data. For ICA application, background noise measurement prior to steam injection may also be recorded to eliminate the white noise from the acoustic surveillance data during the injection period.

Regarding the surface injection wavelet cleanup algorithm, at 545, wavelet analysis may be performed for de-noising the surface injection data (injection steam quality, steam pressure and rate) to smooth out the variations in the data while keeping the most useful information in the surface injection data. For a stable period injection steam quality, steam pressure and steam rate are used in flow profiling algorithms such as thermal hydraulic model. A reliable set of values for surface injection data can be used in the model using the wavelet analysis.

Regarding the wavelet analysis and signal to noise ratio improvement of surface injection data at 545 and temperature surveillance data at 535, a skilled person in the art can use various methods. For example, the wavelet analysis may be HARR wavelet analysis, DB wavelet analysis, SYM wavelet analysis, COIF wavelet analysis, BIOR wavelet analysis, RBIO wavelet analysis, DMEY wavelet analysis, etc.

The cleaned up dataset is used for the steam injection flow profiling. Data cleanup may be performed by the computing system 1700 of FIG. 17, and the computing system 1700 cleans up based on the predefined algorithms and data type (e.g., if temperature surveillance data needs to be cleaned then the computing system 1700 may apply the DTS wavelet cleanup algorithm as in 535). Of course, in some embodiments, the dataset collected at 515 may be used as is without any clean up.

Estimating Temperature Profiles

At 550 of the method 500, the dataset at this point, cleaned up or not, may be further refined. More specifically, at 550, at least one temperature profile may be estimated for the temperature surveillance data of the dataset at this point. At 550, a determination may be made as to whether or not a temperature profile should be estimated or if the original temperature surveillance data should be used in subsequent steps as the temperature profile. The decision may be based on the configuration of the fiber optic surveillance system, wellbore trajectory, well and conformance design, etc. as illustrated at 555. If the decision is to proceed with estimating at least one temperature profile, at 560, a temperature profile may be estimated by separating the temperature surveillance data for the tubing, annulus, casing, etc. For example, estimating temperature profiles may include determining annular temperature data, tubing surface temperature data, behind liner temperature data, or any combination thereof from the dataset at this point based on configuration of the fiber optic surveillance system in the well and design of the well.

Those of ordinary skill in the art may appreciate that in the cases that capillary tubing 180 (including the DTS fiber) is wrapped around the tubing 145 or casing 125, for example, the measured temperature surveillance data may show peaks and valleys that represent the temperature on the surface of tubing 145, the casing 125, or the annulus due to thermal coupling between the capillary tubing 180 and the tubing 145 or the casing 125 at the clamped locations. FIGS. 3A-1 to 3A-6 illustrate several examples of the capillary tubing location and how the DTS fiber can sense different temperatures with slight changes of the capillary tubing location and fluid type around the capillary tubing containing the DTS fiber due to thermal coupling and heat transfer effects. Hence, a separation technique should be applied to the temperature surveillance data to estimate temperature profiles at specific locations (e.g. tubing surface, annulus, and formation) before doing flow profiling analysis.

In one embodiment, at 560, a separation algorithm is used to take into account the clamp conductive heating between capillary tubing and flowing tubing surface, and to generate temperature profiles in both the tubing and annulus. Data processing and wavelet analysis may also be performed to eliminate the noise errors in the separated data. The final separated data is used for the computational algorithms (at 585) to be used for steam injection flow profiling. In one embodiment, two sets of temperature profiles may be estimated from the temperature surveillance data. For example, in a tubing deployed configuration, the temperature peaks and the temperature valleys in the single subset of temperature surveillance data are separated and then the temperature peaks are assigned as tubing surface temperatures and the temperature valleys are assigned as the temperature of the annulus. The peaks and valleys are selected by a maximum and minimum detection algorithm by searching through the temperature surveillance data and applying pre-defined detection tolerances and rules. For other configurations, temperature profiles may also be estimated at different locations in as similar manner.

In one embodiment, downhole pressure or temperature measurement device can be used to calibrate the temperature profiles, using the relationship for saturation temperature and saturation pressure.

Horizontal Steam Injection Test Facility

Figures 2, 4A:
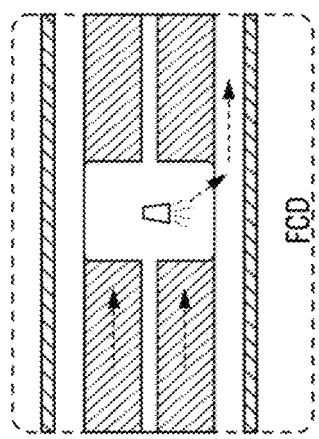
Figure 4B:
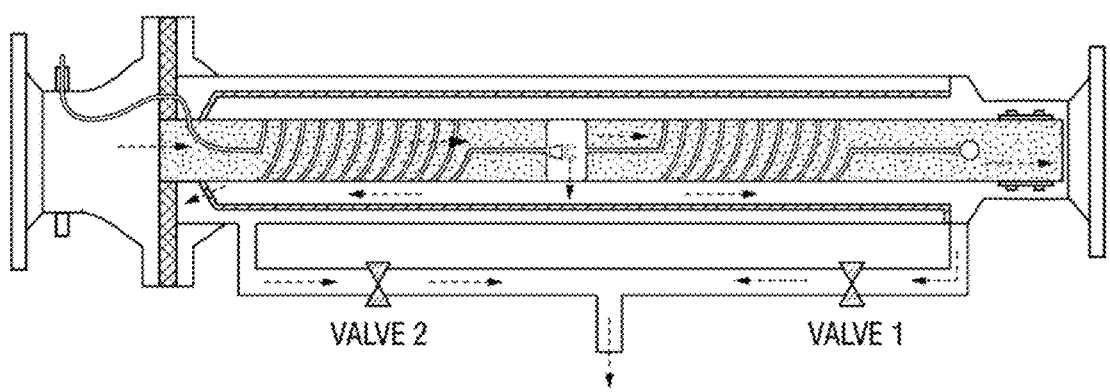

In addition to the steam injection system and the fiber optic surveillance system, some embodiments may also include a horizontal steam injection test facility (HSITF) for steam injection flow profiling. For example, the HSITF may be used to generate flow loop data. The HSITF may be set up on the surface 140 or in a laboratory. FIGS. 4A-1, 4A-2, and 4B illustrate one embodiment of a HSITF 400. HSITF 400 is a full scale laboratory that accelerates the research and development of prototype equipment, and provides data-driven basis for the completion architecture elements design and fiber optic surveillance flow profiling techniques. The HSITF 400 may also reduce the total lifecycle time to mature and deploy the technology. A more detailed discussion of HSITF capabilities can be found in Fram, J. H., Sims, J. C., Sequera, A., & Mayer, T. C., Addressing Horizontal Steam Injection Completions Challenges With Chevron's Horizontal Steam Test Facility. Society of Petroleum Engineers, doi:10.2118/132410-MS, SPE 132410, Jan. 1, 2010, is incorporated herein by reference in its entirety. FIGS. 4A-2 and 4B show the horizontal test section (i.e., flow loop) of the HSITF 400. In the test section, optical fibers (similar to the optical fiber 186) are wrapped around the tubing (similar to the tubing 145) and flow control device (similar to FCD 160). Several nozzles sizes can be installed in the flow control device to inject the steam from tubing to the annulus section (arrows in FIGS. 4A-2 and 4B show the flow directions). There are two valves in the test section that can be in open and close positions. Steam can flow toward the open valves installed in two branches after existing the nozzle on the tubing. If the right valve is open steam flow direction in the annulus and tubing will be the same (Co-current flow) if the left valve is open steam flow direction in the annulus with be opposite to the steam flow in the tubing (Counter-current flow).

Flow Loop Data:

In one embodiment, a test facility includes an automated test flow loop that is employed with a fiber optic bundle in a horizontal section to monitor, temperature and acoustic data of steam flow in a controlled and measured environment.

At 570, the HSITF 400 may be used to generate flow loop data including steam flow acoustic and temperature patterns, heat loss coefficients, pressure differences for steam flow in pipe, nozzle, and slotted liner derived from fiber optic measurements, point measurement devices, or any combination thereof for use in flow diagnosis and flow profiling methods (discussed further at 565 and 590 respectively). This is accomplished through direct measurement of all system inputs, outputs, and variables.

A number of Design of Experiments tests can be conducted in the test facility, including, but not limited to: sequence testing at various inclinations (e.g., up and down at different inclinations), a plurality of steam qualities (e.g., 50%, 60%, 70%, etc.), different downstream pressures (e.g., as measured by the sensors located in the annulus), different upstream pressures (e.g., incoming steam), combinations of valve positions (e.g., simulating the uneven distribution of steam into the formation), any combination thereof, etc.

HSITF Steam Flow Pattern Generation Library:

At 570, in some embodiments patterns can be generated from the HSITF 400. For example, a library or database of measured flow rates and steam quality in the tubing and annulus, measured acoustic and temperature surveillance data from the fiber optic bundle and pressure sensors data is collected. The database may be used to generate a steam injection flow profile (590 pattern recognition algorithm #11) based upon patterns of acoustic surveillance data and temperature profiles observed for various flow conditions in the tubing and annulus.

In one embodiment, steam flow acoustic and temperature observations are collected for various flow conditions in the HSITF. Regression methods (such Least Square or Artificial Neural Network) or classification methods (such as unsupervised learning methods) are applied to find the relationships of system inputs such as flow geometry, valve positions, tubing and annulus pressures, steam qualities, and flow rates to system outputs such as temperature and acoustic observations and characteristic features. In one embodiment temperature and acoustic patterns can be stored in a HSITF pattern generation library as matrices of acoustic energy versus depth and temperature versus depth for a given steam injection rates, pressures, qualities, valve positions in the tubing and annulus. Additionally, the library may also include descriptions of the characteristic features of the temperature and acoustic patterns in functional or textual format.

In one embodiment, steam flow acoustic and temperature observations are collected for various flow conditions in the HSITF. Regression methods (such Least Square or Artificial Neural Network) are applied to find the relationship of system inputs such as geometry, pressures, steam qualities, and flow rates in the tubing and annulus to system outputs such as temperature and acoustic observations. An inverse proxy model can be also developed to find the flow rate in the annulus as an unknown variable for the known fiber optic temperature and acoustic observations. Moreover, the proxy model can be applied for sensitivity analysis, heat transfer models calibration, and flow direction analysis.

In another embodiment, the characteristic features of temperature identified from the HSITF 400 include the pattern of temperature cooling in the flow and no-flow sections of the annulus, high steam quality versus low steam quality, high flow rate versus low flow rate, etc. In another embodiment, using signal processing techniques, the characteristic frequency and power of sound for the flow in various elements of the HSITF 400 such as nozzles flow, pipe flow, and flow through slots in the liner are collected in the database for the acoustic pattern recognition techniques. In the algorithms section (585), the pattern recognition techniques are discussed in more detail.

As explained at 570, in one embodiment, the HSITF flow loop data can be used for flow diagnosis (such as packer integrity, performance of FCD, etc.). The flow loop data may also be used for validation of various computational algorithms (such as thermal hydraulic model, orifice model, pressure gradient, pattern recognition) and to assess which flow profiling algorithms may be confidently used given the observed operating conditions (steam pressure, steam quality, rate).

Non-Fiber Optic Surveillance Data

In addition to flow loop test data and fiber optic surveillance data, non-fiber optic surveillance data (575) can be used to generate flow diagnosis results. Non-fiber optic surveillance data may include TOW data, injection and production data from other wells, well logs, flow line temperatures.

Flow Diagnosis and Flow Diagnostic Results

At 565 of the method 500, the dataset at this point, cleaned up or not, with or without estimated temperature profiles (and the annular temperature data, the tubing temperature data, etc.) may be used for flow diagnosis and to generate flow diagnostic results.

At 565 of the method 500, flow diagnosis is performed to analyze the wellbore and near wellbore flow, wellbore integrity, flow control device performance, packer integrity, tubing and casing integrity. This step can be used to diagnose flow problems such as plugging, excessive heat loss, low steam quality, steam leakage from tubing or casing, non-critical flow conditions in nozzles, etc. Flow diagnosis may include intervention, interpretation, validation, or any combination thereof by an engineer. Nonetheless, flow diagnostic results may be generated at 565, and the flow diagnostic results may be based on the dataset, the annular temperature data, the tubing temperature data, flow loop data, non-fiber optics surveillance data, or any combination thereof.

Additionally, flow diagnosis is performed to choose the most appropriate computational algorithms that can be used for quantitative steam injection flow profiling in the wellbore. In fact, each computational algorithm is valid within certain flow conditions and assumptions that need to be verified. In one embodiment, a weight factor is associated with the selected computational algorithm or computational algorithms from a set of computation algorithms based on the flow diagnosis results. For example, if the nozzles are not in critical flow condition, the thermal hydraulic model algorithm may receive low weight factor if it uses the critical flow model (for example to model the venturi nozzles). Moreover, if the slug flow regime is not detected in the wellbore, then the waterfall method would not be applicable for steam injection flow profiling. Therefore, the flow diagnostic results may be used to select which computational algorithm or computational algorithms from a set of computation algorithms can be used to i) associate each selected algorithm to a weight ii) determine the steam injection flow profile for the steam injection. In one embodiment, the flow diagnosis comprises detecting the existence of liquid and vapor phases along the wellbore. The liquid and vapor phases' existence may be used to indicate the heating efficiency of the steam injection in different wellbore segments.

In one embodiment, the liquid and vapor phases in the annulus can be identified from the temperature profiles, with the liquid filled wellbore segments showing smoother and lower temperature than the vapor filled wellbore segments. This distinction is due to the heat transfer contrast between liquid and vapor, which cools down the capillary tubing 180 at different rates. Since liquid has a higher heat transfer coefficient than vapor, before reaching the nucleic boiling point, it can cool down the capillary tubing 180 containing fiber 186 significantly. However, since vapor has a smaller heat transfer coefficient, it cannot cool down the capillary tubing 180 as much as liquid. Hence, it is expected that in the vapor filled zones, a thermally coupled clamped capillary tubing 180 in the vicinity of the tubing 145 warms up to a higher temperature. Therefore, the distinction between liquid and vapor phases in temperature profiles can be used to monitor the fluid interface movement in the wellbore 105.

In one embodiment, the acoustic surveillance data is used to detect the liquid and vapor coexistence along the wellbore 105. The DAS fiber detects relatively high noise levels in the regions where accumulated liquid pool boils off (nucleate bubble generation and coalescence noise) or regions where slug or intermittent flow regimes exists.

In one embodiment, the temperature and acoustic surveillance data can be used to observe slug flow regimes in the wellbore 105. Slug or intermittent flow regimes may be generated in the wellbore 105 due to liquid hold-up originating from steam condensation, changes in injected steam quality and rates, wellbore geometry, wellbore trajectory, or formation fluid entering the wellbore 105.

In one embodiment, temperature profiles can be used to monitor liquid condensing and boiling and fluid movement in the wells based on the distinguishing liquid and vapor phase features.

In one embodiment, temperature profiles can be used to monitor the isolation packer integrity by comparing the absolute temperature and the temperature gradient in both sides of the packer, such as the packer 170. Any sign of cooling or warming can be an indication of steam leakage across the packer. In another embodiment, acoustic surveillance data can be used to monitor the flow on both sides of the packer to find the steam leakage.

In one embodiment, the acoustic surveillance data can also be used to detect the orifice noises in high frequency ranges to identify the tubing steam leakage or tubing cracks.

In one embodiment, the acoustic surveillance data can be used to characterize the flow control device noises and the performance of the nozzles in the downhole condition. Specific harmonic frequencies are associated with the nozzles, such as the nozzles 160, that can distinguish different sizes of the nozzles and the condition of the flow through each nozzles, such as critical or non-critical flows, two-phase or liquid flow, phase splitting.

In another embodiment, HSITF steam flow acoustic and temperature patterns can be used to help characterize the flow control device noises and the performance of the nozzles in the downhole condition.

In another embodiment, the flow diagnosis is applied to monitor Cyclic Steam Stimulation (CSS) and may be used to generate an assessment of effectiveness of injection and production cycles. In one embodiment, this assessment is generated by using the temperature profiles and acoustic surveillance data to detect wellbore segments with significant temperature changes and high acoustic noise levels which identify portions of the formation that receive steam during the injection period and portions of the formation with increased production after heating.

In short, the flow diagnostic results may be based on many factors. For example, the flow diagnostic results may be based on the dataset (such as the dataset at this point, which may cleaned up or not due to quality criteria (520-545), and which may be smaller due to collection criteria (510-515), the temperature profiles data (e.g., from 560), flow loop data (570), non-fiber optics surveillance data (575), or any combination thereof.

Based on the type and/or quantity of the flow diagnostic results available, for example, the computing system 1700 may automatically select the which computational algorithm or computational algorithms from a set of computation algorithms can be used with what weight factors to determine a steam injection flow profile for the steam injection. For example, the presence of a certain type of data, the presence of certain values or trends, thresholds, etc. may be utilized to automatically pick the computational algorithm(s) and associated weights. HSITF analysis may also be used to pick the computational algorithm(s) and associated weights. Some computational algorithms have certain requirements (e.g., for the physics to work), and the computing system 1700 may automatically determine if the flow diagnostic results satisfy those requirements, and if so, the computing system 1700 may select those computation algorithms and assign the weights. Furthermore, an engineer may verify the selections and associated weights.

At 580, if more surveillance data is required, control may return to 515. After sufficient data has been received, control may pass to 585.

Set of Computational Algorithms

In one embodiment, the invention relates to the development of computer models (algorithms) to compute steam injection flow profiles based on various methodologies and physical principles. FIG. 5 shows various computation algorithms that may be selected and executed. FIG. 6 illustrates an example steam injection flow profile that may be determined by executing multiple computational algorithms, along with various weights associated with the executed computational algorithm.

Various computational algorithms can be developed as shown in Table 1, which summarizes various computational algorithms and applicable physical principles. In the table: P: Pressure, RES: Reservoir, TRAJ: Well Trajectory, GEMO: Well Geometry, INJ/PROD: Wellhead Injection/Production Rates and Pressure, SAT: Steam Saturation Pressure, DIR: Direct Pressure Measurement, SS: Steady State, TR: Transient, and PSS: Pseudo Steady State.

Algorithms 1 to 5 are based on steady state multiphase flow and heat transfer calculations and use surface injection created between the flow control device wellbore segments where the pressure gradient is zero. 3) Total surface injected mass of steam is equal to the net summation of fluid mass injected from wellbore segments to the formation. 4) In the case of using packers in the wellbore, there are temperature and flow discontinuities at the location of packers.

The computational algorithms have been developed in a way that can consider various fiber installation schemes in the flow paths such as inside the tubing (e.g., the tubing 145), outside of the tubing (e.g., the tubing 145), in the annulus (e.g., the annulus 169), and outside of the liner (e.g., the liner 130).

In one embodiment the following computational algorithms can be applied for steam injection or steam and solvent. Steam solvent can be a mixture of hydrocarbon gas and steam.

Computational algorithms are in the following table:

| Algorithm | Components | DTS | DAS | P | Type | Physical Principle |
|---|---|---|---|---|---|---|
| 1 | RES, TRAJ, GEMO, INJ/PROD | x | | SAT/DIR | SS/PSS | Hydraulic model, multiphase flow in well, heat transfer |
| 2 | GEOM, TRAJ INJ/PROD | x | | SAT | SS | Hydraulic model, multiphase flow in well, heat transfer |
| 3 | GEOM, TRAJ INJ/PROD | x | | SAT | SS | Hydraulic model, multiphase flow in well, heat transfer |
| 4 | GEOM, TRAJ, INJ/PROD | x | | SAT | SS | Orifice pressure differential |
| 5 | GEOM, TRAJ | x | | | SS | Liner slots pressure differential |
| 6 | GEOM, TRAJ | x | | | TR | Transient cooling and warming, Mass body heat capacity and heat conduction |
| 7 | GEOM, TRAJ, INJ/PROD | x | x | | SS | Signal processing, speed of sound and flow medium velocity calculation from Doppler shift |
| 8 | GEOM, TRAJ | | x | | SS | Signal processing, signal frequency and power spectral density distribution |
| 9 | RES, TRAJ, GEMO, INJ/PROD | x | x | SAT | SS | Combined speed of sound and temperature model, calculate steam quality, thermal hydraulic wellbore model |
| 10 | GEOM, TRAJ | x | x | | TR | Shock front wave (either sound or temperature) travel time, waterfall |
| 11 | GEOM, INJ/PROD | x | x | | SS | Use test flow loop for temperature or acoustic pattern recognition | data, temperature profiles and optionally downhole pressure measurement device data. Algorithm 6 is a semi-analytical model based on the early and late transient cooling down and warming up temperature change during shut-in or start-up processes, respectively. Algorithm 7 is based on the temperature profile and acoustic surveillance data and signal processing techniques. Algorithm 8 is based on the acoustic surveillance data and signal processing techniques. Algorithms 9 and 10 are combinations of acoustic and thermal hydraulic models, which need both temperature and acoustic surveillance data. Algorithm 11 is based on a steam flow acoustic and temperature patterns library obtained from a test flow loop (e.g., the HSITF 400).

In one embodiment, In all of the computational algorithms, material balance rules apply. In one example, the material balance rules include: 1) In the stable flow condition, inlet and outlet mass flow rates in blank sections (tubulars with no apertures) are equal. 2) In high pressure friction loss in the wellbore, no-flow boundaries can be Thermal Hydraulic Coupled Wellbore/Reservoir Model (Algorithm #1):

This Algorithm #1 is referred to as "Thermal Hydraulic Model" at 585 of FIG. 5. FIG. 7 is a schematic view of steam flow through tubing, annulus, and formation nodes and the connection of nodes and pipes in an embodiment of a wellbore configuration/network setup. FIG. 7 is a schematic view of one example of a tubing deployed well completion. Algorithm 1 can be used to solve mass balance, energy balance, mechanistic multiphase flow momentum balance, and dynamic heat transfer models for each node and pipe segment in the network set up. Additionally, pressure loss models can be incorporated for the flow control devices in the network setup. A flow control device pressure drop model may be critical flow or non-critical flow. In one embodiment the flow control device pressure drop model can be developed using a test facility, such as the HSITF 400. In another embodiment, industry available models may be used as the flow control device pressure drop model.

Equations 1 through 3 show the overall system of conservation equations. The equations can be solved using finite volume and semi-implicit numerical schemes, and the Newton Raphson iteration algorithm may be used to converge the solution for the primary variables (phase velocities, pressure, temperature, and steam quality).

$$(P_u)_k - (P_d)_k = \left(\frac{\partial P}{\partial z}\right)_{fric} \cdot dz + \left(\frac{\partial P}{\partial z}\right)_{acc} \cdot dz + \left(\frac{\partial P}{\partial z}\right)_{gra} \cdot dz + \left(\frac{\partial P}{\partial z}\right)_{FCD} \quad \text{Eq. 1}$$

$$k = 1, \ldots, N_{pipe}$$

$$\sum_{i=0}^{ns} q_{ij}\rho_{ij}M_{ij} + W_{si} + \psi_i = 0 \quad j = 1, \ldots, N_{seg} \quad \text{Eq. 2}$$

$$\sum_{i=0}^{ns} q_{ij}\rho_{ij}h_{ij}M_{ij} + W_{si}h_{si} + \psi_i h_i + Q_{loss} = 0 \quad j = 1, \ldots, N_{seg} \quad \text{Eq. 3}$$

In Equations 1 through 3, the parameters and variables are defined as follows: i and j are the index for the nodes, k is the index of pipe, each pipe is the flow path between two nodes, $N_{seg}$ is the total number of nodes, $N_{pipe}$ is the total number of pipe elements, $P_u$ is the upstream pressure of a pipe element, $P_d$ is the downstream pressure of a pipe element, $$\left(\frac{\partial P}{\partial z}\right)_{fric}$$

is the pressure drop calculation for the friction loss, $$\left(\frac{\partial P}{\partial z}\right)_{acc}$$

is the pressure change in pipe flow due to acceleration, $$\left(\frac{\partial P}{\partial z}\right)_{gra}$$

is the pressure gradient term due to gravity, $$\left(\frac{\partial P}{\partial z}\right)_{FCD}$$

is the pressure drop equation if flow control devices exists in the pipe flow between two nodes, $q_{ij}$ is the flow rate between nodes i and j, $\rho_{ij}$ is the density (lbm/ft$^3$) of the fluid mixture which is calculated from upwind scheme between nodes i and j, $M_{ij}$ is the connectivity matrix for the nodes i and j, $M_{ij}$ is one, if nodes i and j are connected and zero if they are not connected, $W_{si}$ is the mass supply term in the flow line (e.g., wellhead injection mass), $\psi_i$ is the mass source/sink term in the flow line (e.g., fluid outflux to the formation), $h_{ij}$ is the specific enthalpy (btu/lbm) of the fluid mixture which is calculated from upwind scheme between nodes i and j, $h_{si}$ is the supply term specific enthalpy, $h_i$ is the sink term specific enthalpy, and $Q_{loss}$ is the heat loss.

The primary unknowns in Equations 1 through 3 are pressure, velocity of vapor and liquid, and steam quality at the nodes. Several closure relationships, based on the dominant flow regime in the flow path, are used to calculate the slip flow between liquid and vapor in the momentum equation.

In algorithm #1, prediction capability can be improved by calibrating the heat transfer and flow control device models using the flow loop data (e.g., from HSITF 400). Additionally, multiphase flow calculation methods can be incorporated, such as homogenous, drift-flux, Beggs and Brill, and completely mechanistic and flow regime based models to reduce the calculation errors.

Figure 8:
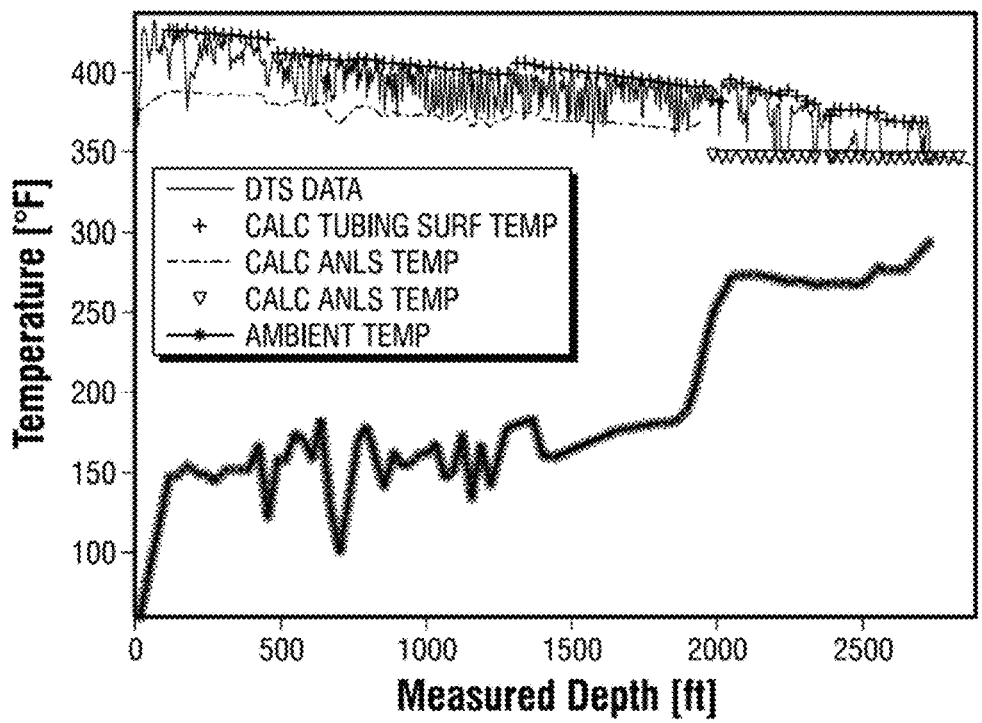
FIG. 8 illustrates one example of the thermal hydraulic wellbore model temperature prediction against temperature profiles.

In another embodiment, the algorithm #1 can be further refined by comparing the calculated temperature from flow models with the estimated temperature profiles at the tubing surface and annulus (in tubing deployment as in FIG. 5 at 560). In one embodiment, the formation pressure adjacent to the wellbore can be determined from the hydrostatic pressure of the liquid column in the wellbore (determined from baseline temperature profile as discussed in the flow diagnostic section). In another embodiment, the heat transfer coefficients in the wellbore are tuned based on the liquid and vapor phase existence around the fiber to match the temperature profiles. Multi-variable, multi-objective, constrained optimization algorithms are used to match coupled wellbore/reservoir models results with the estimated temperature profiles. FIG. 8 illustrates one example of the thermal hydraulic wellbore model temperature prediction against temperature profiles.

In another embodiment, the thermal hydraulic model can predict several flow parameters such as the liquid and vapor flow rate, pressure, temperature, steam quality, flow regimes, and slip holdup in the tubing and annulus.

Pressure Gradient Model (Algorithm #2):

This Algorithm #2 is referred to as "Pressure Gradient" at 585 of FIG. 5. Assuming saturation condition for the steam flow, the measured temperature data in the flow path can be converted to a steam injection flow profile as follows: 1) Calculate pressure profiles from temperature profiles and steam saturation pressure correlation; 2) Calculate the spatial derivative of the pressure dP/dL—when dP/dL equals zero, this establishes a no flow boundary and establishes material balance regions; 2) Estimate the steam quality in the annulus from pressure and steam quality at wellhead and average pressure at annulus; 3) Solve the momentum equation iteratively to calculate the velocity of vapor and liquid mixture and velocity of vapor and liquid from pressure gradient value; 4) Solve the steam quality from energy equation, and go back to item 3 for another estimate, or proceed to next step if the results are satisfying; 5) Update the rates in the material balance regions from total injection rate at wellhead; and 6) Output the results of Algorithm #2.

Temperature Gradient Model (Algorithm #3):

This Algorithm #3 is referred to as "Temperature Gradient" at 585 of FIG. 5. Algorithm #3 is applicable for instances in which the optical fiber is installed outside of the liner or casing, such as the liner 130 or the casing 125. The optical fiber in this configuration senses the steam temperature in the portion of the formation adjacent to the wellbore where steam enters into the formation through slotted liner or perforation or aperture. This near wellbore formation temperature profile can be used to find the near wellbore heated portions of the formation and the magnitude of cumulative injected steam in each portion of the formation. Injected heat is proportional to the temperature increase of each wellbore segment with respect to a baseline reference temperature. In one embodiment, the temperature gradient on the surface of the liner can be used to calculate the temperature gradient in the wellbore and consequently the pressure gradient from a steam table. Once the pressure gradient is calculated, Algorithm #2 can be applied for the velocity and rate calculation.

In one embodiment, the temperature gradient plot can be used to distinguish the liquid and vapor phases in the wellbore segments. As explained in the flow diagnosis section. Hence, plotting temperature gradient (dT/dL) can reveal the fluid composition change in the well.

Figure 9:
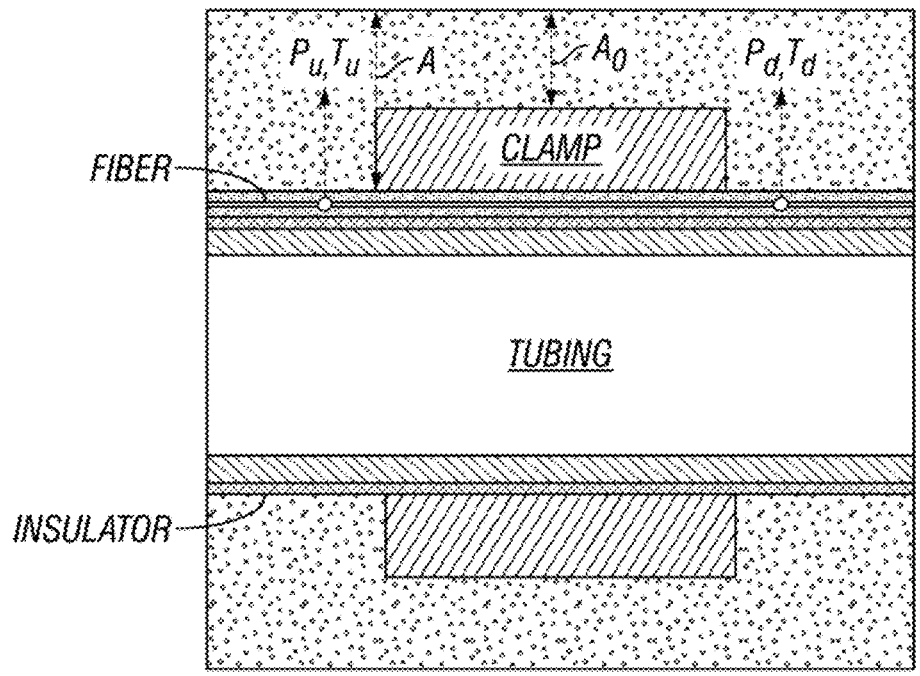
FIG. 9 illustrates one embodiment of a capillary tubing connected to a tubing by at least one clamp.

Flow Path Differential Pressure and Orifice Flow (Algorithm #4):

This Algorithm #4 is referred to as "Orifice Model" at 585 of FIG. 5. This algorithm is applicable for the saturated steam injection process if the pressure measurement is not available, since the pressure and saturation temperature are correlated. Additionally, this algorithm is recommended to be used when the capillary tubing is installed with insulation pads to minimize the thermal coupling effect. As illustrated in FIG. 9, the fiber optic capillary tubing (e.g., the capillary tubing 180) is connected to the tubing (e.g., the tubing 145) by at least one clamp. Clamps with larger outer diameter can create orifice shape contracted flow paths. Using high precision temperature sensing, the pressure drop across the clamps can be measured. This pressure drop is correlated to the velocity of fluid passing through the clamps as follows:

$$v_m = K\sqrt{\frac{\Delta P}{\rho_m}} \qquad \text{Eq. 4}$$

Thus, using Algorithm #4, the bulk velocity at clamp zones along the wellbore can be computed. In one embodiment, the orifice coefficient (K) in Equation 4 can be calibrated with the flow loop data (e.g., from HSITF 400) or industry available orifice models.

Liner Slots Pressure Differential (Algorithm #5):

This Algorithm #5 is referred to as "Slotted Liner Pressure Difference" at 585 of FIG. 5. This algorithm is applicable for the saturated steam injection process and fiber optic installation outside the liner, such as the liner 130. In one embodiment, the steam injection conformance design uses slotted liners to deliver the steam to the formation. Slots are uniformly created flow areas on the liner that allow steam to flow from wellbore to the formation. Since the flow area through slots of the liner is restricted, it creates a pressure drop between the wellbore and formation fluids. The pressure drop in slots of the liner is correlated to the flow rate across the slots of the liner. The steam injection flow profile can be computed from pressure drop profile across the slotted liner along the wellbore using the rate and pressure drop correlation. In one embodiment, the pressure drop and flow rate correlation is obtained from flow loop data (e.g., the HSITF 400). In another embodiment, the pressure drop and rate correlation can be obtained from industry available slots pressure differential models. In one embodiment, the pressure drop profile across the slotted liner is calculated as follows: 1) calculate the behind the liner pressure profile using a steam saturation table and behind the liner temperature profile, 2) calculate the annulus pressure profile i using a steam saturation table and annulus temperature profile, 3) calculate the pressure drop profile across the slotted liner by subtracting the annulus pressure and behind the liner pressure In another embodiment, this algorithm can be used with other forms of the apertures in the liner such as screens, wire and ribs welded on perforated base pipe, stainless steel wool media.

Transient Temperature Warm-Up and Cool-Down (Algorithm #6):

This Algorithm #6 is the basis of "Early Transient Model" and "Late Transient Model" as referred at 585 of FIG. 5. In this algorithm, we use a temperature profile, from immediately before transient period (i.e., the baseline temperature profile) and several temperature profiles from transient period (such as shut-in, warm-up) to calculate the cumulative steam injection in segments along the wellbore using the relationships between the rate of cool-down and rate of warm-up and the amount of energy stored in the formation due to steam injection. Where the change of energy in the rock is related to change of the temperature as follows:

$$\frac{dE}{dt} = V_{rock}\overline{Cp}\frac{dT}{dt}$$

is the rate of rock energy change, $V_{rock}$ volume of heated rock, $\overline{Cp}$ heat capacity of the rock and $$\frac{dT}{dt}$$

is the rate of temperature change).

Figure 11:
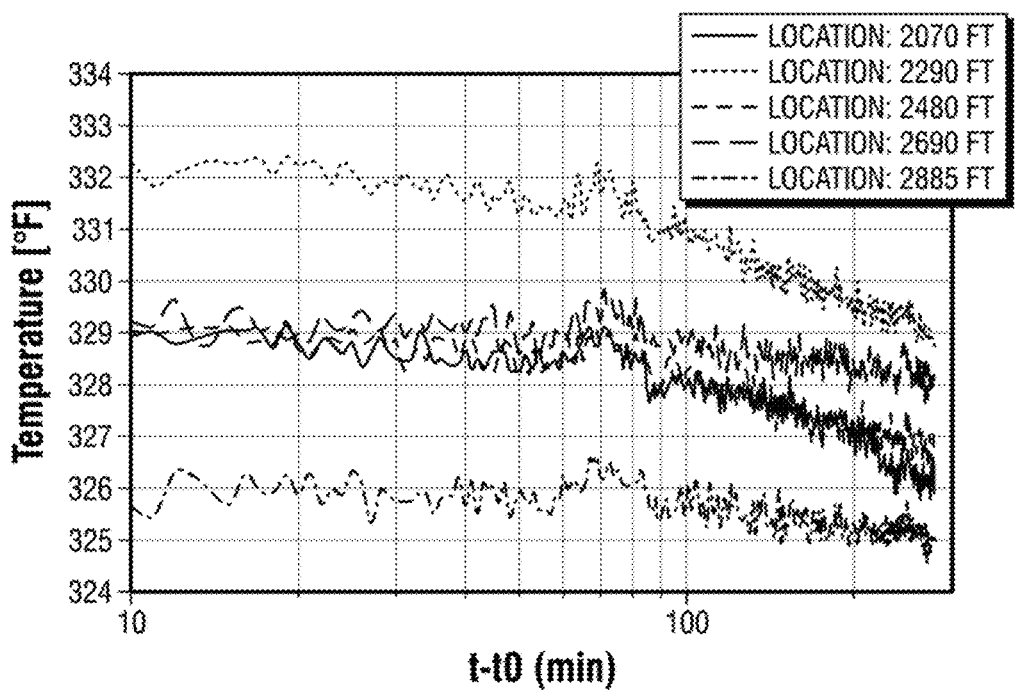
FIG. 11 illustrates example results of temperature cool down during early transient shut-in periods.

In one embodiment, the early transient algorithm is employed during cool-down as follows: 1) plot a semi-log plot of temperature as function of shut-in time for each wellbore segment 2) Calculate the slope of temperature cool down for each wellbore segment (FIG. 11). 4) Compute the inverse value of the calculated slope 5) Normalize the calculated inverse slopes 6) Set the percentage of injected steam in each wellbore segment to the normalized inverse slopes.

Figure 10A:
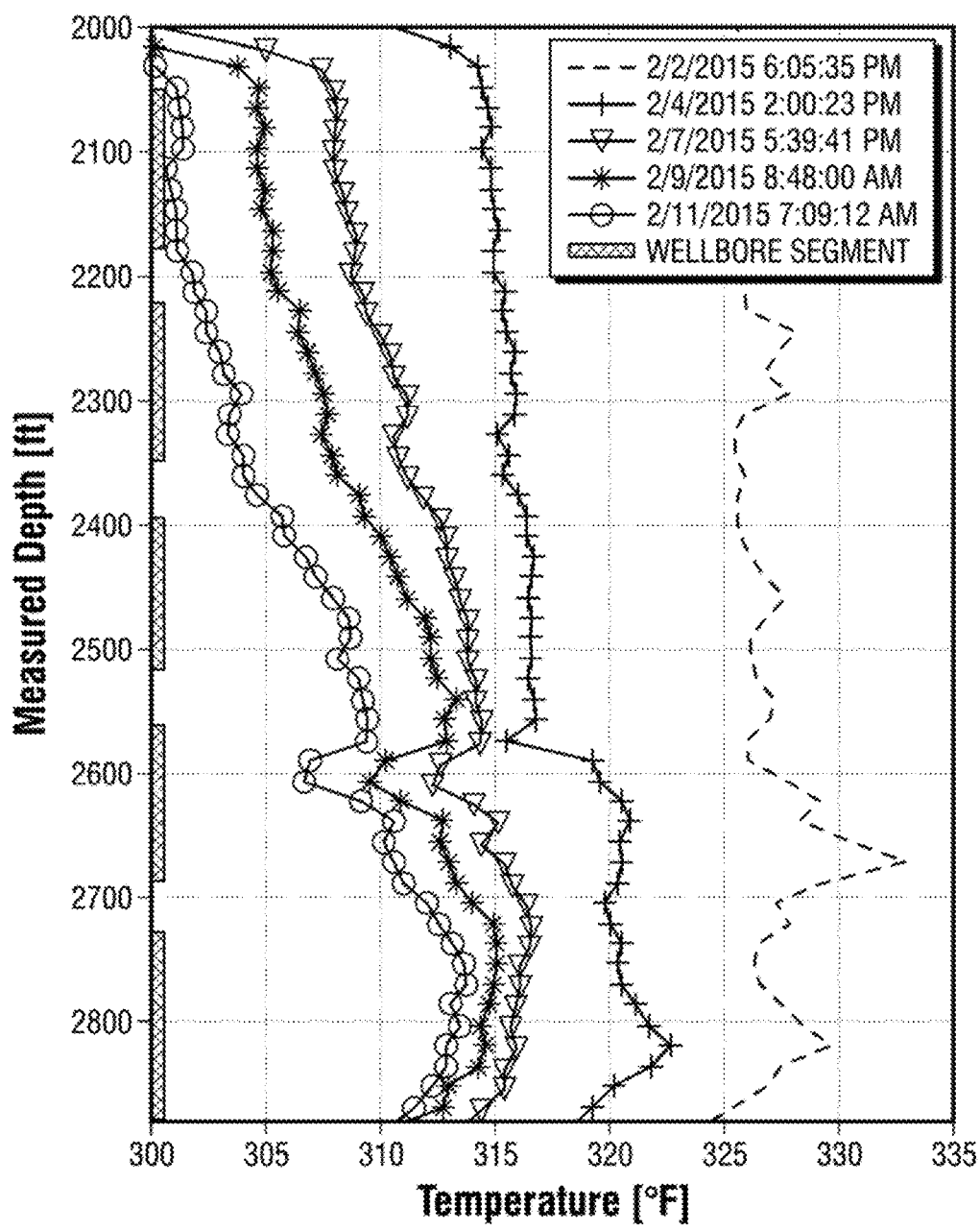
FIGS. 10A and 10B illustrate example results of temperature cool down during late transient shut-in periods.
Figure 10B:
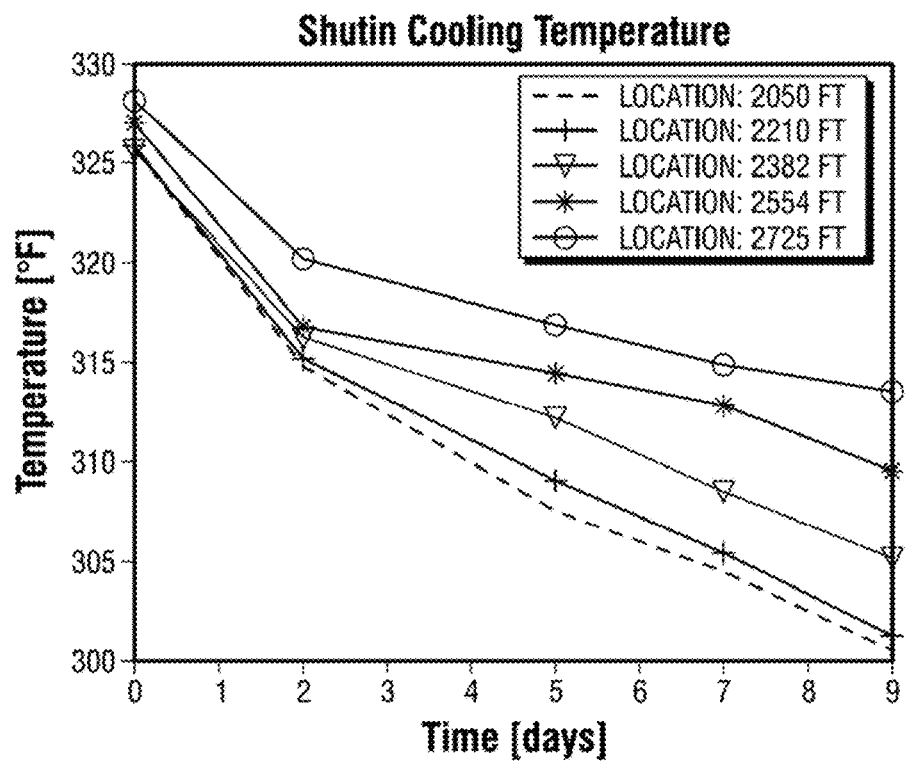

In another embodiment, the late transient algorithm is employed during cool-down as follows: 1) plot the temperature as function of shut-in time for each wellbore segment 2) Calculate the slope of temperature cool down for each wellbore segment (FIG. 10B). 4) Compute the inverse value of the calculated slope 5) Normalize the calculated inverse slopes 6) Set the percentage of injected steam in each wellbore segment to the normalized inverse slopes.

In another embodiment, the transient algorithm can be employed during workovers if cold liquids are used to cool the well during shut-in period as follows: 1) plot the temperature as function of warm-up time for each wellbore segment 2) Calculate the slope of temperature warm-up for each wellbore segment. 5) Normalize the calculated slopes 6) Set the percentage of injected steam in each wellbore segment to the normalized slopes.

Doppler Shift Principle (Algorithm #7):

This Algorithm #7 is referred to as "Doppler Shift (F-K)" at 585 of FIG. 5. This algorithm is based on the Doppler effect in the frequency of the moving objects (fluid) sound measured at the stationary distributed acoustic sensors. In this algorithm, the following steps may be performed: 1) divide the fiber channels to several regions (e.g., covering ~20 acoustic channels at each region) to convert the data from space-time domain to wavenumber-frequency domain using 2D Fourier Transform; 2) plot the wavenumber-frequency-power to see high intensity lines slope; 3) fit lines to the high intensity points and calculate the slope of the lines using the power integration technique at various angles; 4) calculate the speed of sound for up-going and down-going speed of sound; 5) calculate the bulk fluid velocity from the Doppler shift equation; and 6) check the no flow boundaries in material balance regions as a calibration for the interpreted velocity values; 7) use the speed of sound and temperature profile to calculate the steam density, and steam quality; 8) use the steam density to calculate the steam flow rate with in the annulus as cold liquid equivalent (CWE) unit. 9) use the change in steam flow rate along the annulus to calculate the steam injected from each wellbore segment into the formation.

Figure 12:
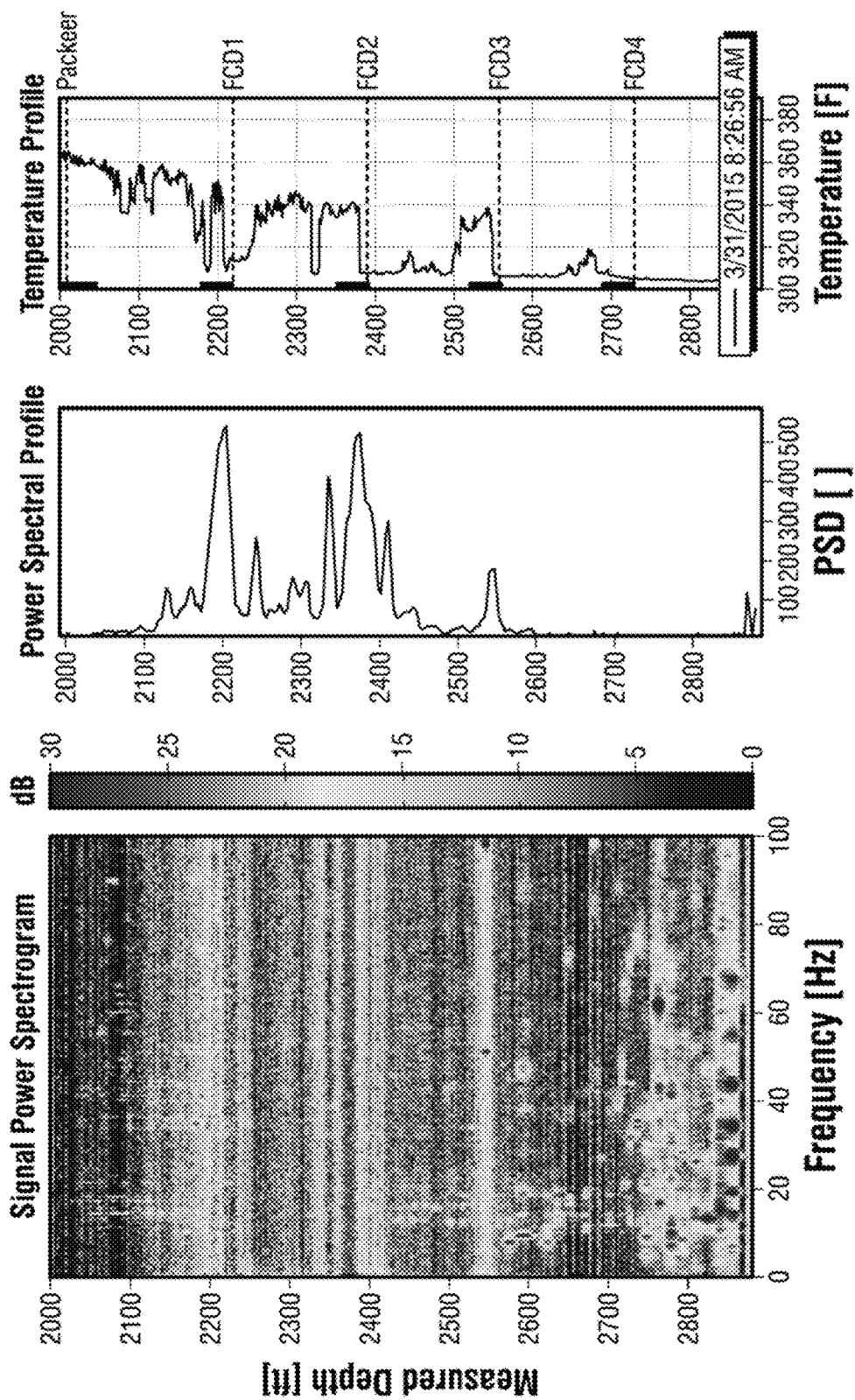
FIG. 12 illustrates an example of spectrogram results in a low frequency region and a corresponding temperature profile.

Modified Acoustic Frequency and Power Spectral Density (Algorithm #8):

This Algorithm #8 is referred to as "Acoustic Power Spectrogram" at 585 of FIG. 5. This algorithm is derived from the spectrogram analysis of the vibration or acoustic surveillance data and averaging the power spectral density of the data in carefully chosen low, mid, and high frequency ranges based on the similar energy levels and clustering of the data. FIG. 12 illustrates an example of spectrogram results in a low frequency region and a corresponding temperature profile. A unique frequency interval is obtained in the data that applies for the steam flow noise generation. This algorithm can be used to analyze the local flow regimes (such as slug and intermittent flows) detection, the direction of the flow, the velocity of fluid movement, and the performance of the nozzles based on the characterized frequency ranges.

In one embodiment, power spectrogram analysis can be used to identify the a frequency range that can detect the noise of fluid flow through the apertures in the liner. The amplitude of the noise through the apertures is proportional to the fluid flow rate. Hence, the steam injection flow profile can be found using the normalized amplitude of the noise in the identified frequency range.

Figure 13:
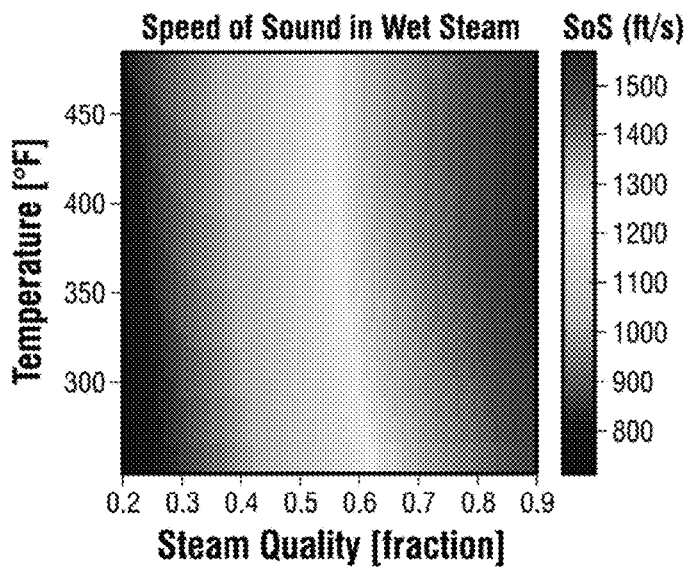
FIG. 13 illustrates one example of a correlation map that relies on correlations of speed of sound in vapor and liquid steam, as well as correlation for two-phase speed of sound from pure vapor and liquid speed of sound.

Combined Speed of Sound and Temperature Model (Algorithm #9):

This Algorithm #9 is referred to as "Speed of Sound Thermodynamics" at 585 of FIG. 5. Speed of sound varies in steam for different temperature and steam qualities. This algorithm relies on correlations of speed of sound in vapor and liquid steam (International Association for the Properties of water and Steam, IAPSW) and correlation for two-phase speed of sound from pure vapor and liquid speed of sound (A. B. Wood 1930, "A Textbook of Sound", which is incorporated herein by reference in its entirety). In this algorithm, the following steps are performed: 1) FIG. 13. generate a map of two-phase steam speed of sound as function of steam quality and steam saturation temperature 2) Compute the two-phase speed of sound in the annulus using acoustic surveillance data as discussed in Algorithm #7, 3) use the generated map, two-phase steam speed of sound and annulus temperature profile to obtain the quality of steam in the annulus. 4) Use the calculated annulus steam quality profile in Algorithm #1 instead of the annulus steam quality estimated via heat loss model, to predict the steam injection flow profile.

Combined DTS and DAS Waterfall (Algorithm #10):

This Algorithm #10 is referred to as "Waterfall Analysis" at 585 of FIG. 5. A waterfall plot is a three-dimensional plot in which multiple curves of data, e.g., spectra, are displayed simultaneously. FIGS. 14A, 14B, 14C, and 14D illustrate examples of surface injection data and a waterfall plot for a set of acoustic surveillance data and temperature profiles.

In this algorithm, the wave shock travel time at early transient injection or production of the fluids is analyzed against contrasted temperature (e.g. hot steam is injected in a well shut-in with cold water). The velocity of the front wave during the early time of injection represents the convective flow velocity in the well. Using a high resolution temperature profile along the well, the traveled time and distance of the temperature waves and consequently the velocity of the moving shocks can be calculated. The absolute velocity of the bulk of the fluid along the well can be computed.

In one embodiment, for horizontal wells, the direction of the flow can also be detected based on the direction of the wave propagation. Similar analysis can be done for the acoustic surveillance data instead of temperature profiles.

In one embodiment, the DTS/DAS waterfall methods are applicable for early transient or steady state conditions or sudden changes and fluctuations during the operation, where slug flow regimes exist. During steam injection, there are wellhead steam quality and pressure fluctuations that can create liquid condensates and slugs in the downhole. The induced liquid slugs in the downhole can create temperature shock waves due to heat transfer cooling effects. The liquid slug movement in the downhole also shows wave propagation in the DTS data that can be used to find the direction of the flow and the velocity of fluid movement. In slug flow regimes, where liquid movement can create noise in the system, DAS waterfall analysis can be insightful. A unique frequency range is found by signal processing methods to generate waterfall plots that can show different features of noise waves and the detail of the high intensity waves flow in the well. Accordingly, the velocity and the direction of fluid flow can be calculated from the slope of high power noise in space-time coordinates.

Figure 14A:
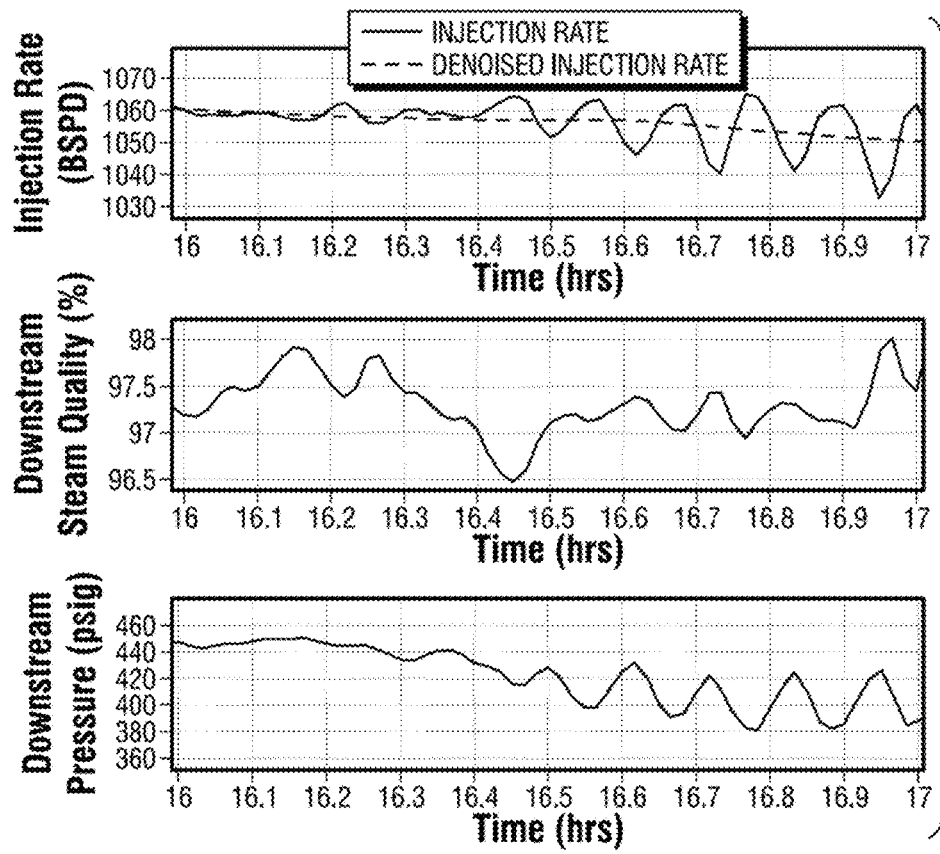
FIGS. 14A, 14B, 14C, and 14D illustrate examples of surface injection data and a waterfall plot for a set of acoustic surveillance data and temperature profiles.
Figure 14B:
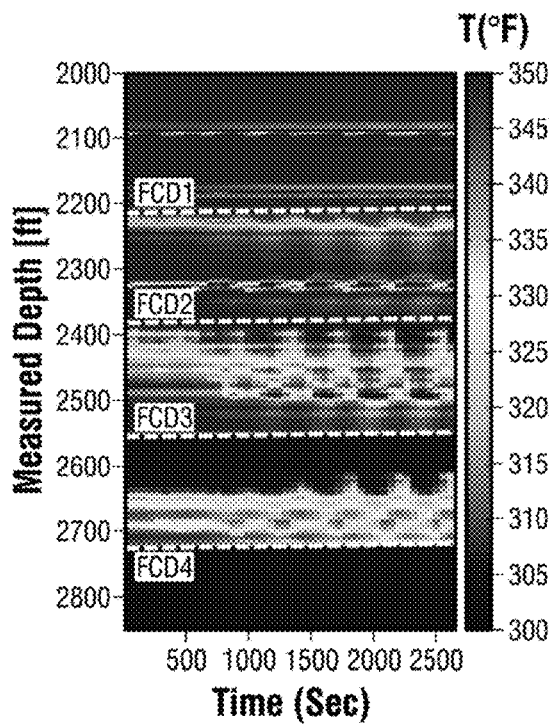
Figure 14C:
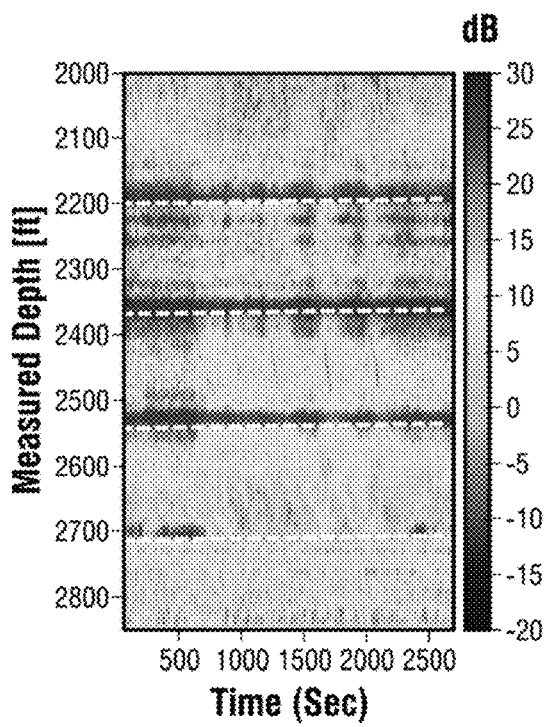
Figure 14D:
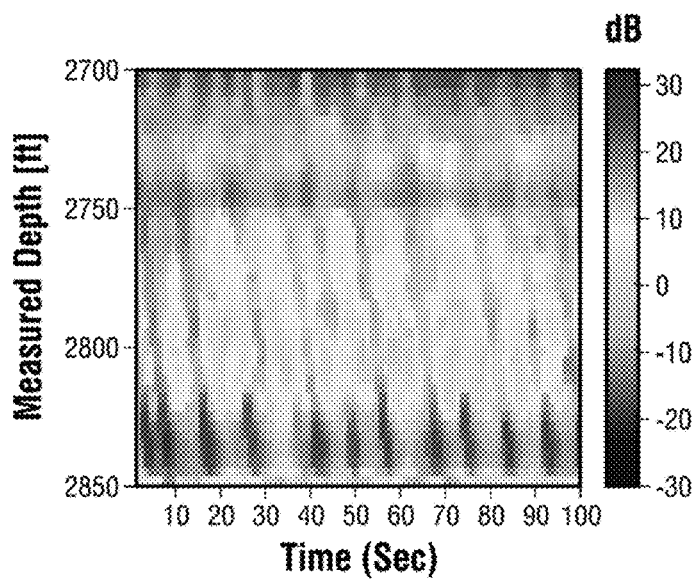

As an example, FIG. 14A illustrates the surface injection rate, quality, and pressure data for a period of time that fluctuations are being created in the injection system. As surface data shows, after 16 hours of injection, the pressure and rate are oscillatory indicating of thermal slug creation in downhole. Consequently, both DTS and DAS waterfall plots in FIGS. 14A, 14B, 14C and 14D show the flow behavior in the well. FIGS. 14B and 14C show that slugs are being propagated in the annulus from the nozzles. DTS data in FIG. 14B shows that exited steam from FCD3 and FCD4 moves to the toe direction and exited steam from FCD2 is split in two directions. DAS data in FIG. 14C confirms that steam flows to the toe direction. If we zoom in the area above the FCD4 in the DAS data, FIG. 14D, it can be observed that very high frequency slugs move in the toe region. Although temperature profile shows relatively colder liquid presence in the toe region, acoustic surveillance data reveals high frequency slug flow instead of pure liquid flow. Using temperature profile, and calculating the velocity of slugs, the steam bulk flow rates may be obtained.

In one embodiment, the slug flow regimes or intermittent flow regimes downhole can be observed in the acoustic data waterfall plots in relatively low frequency regions. The acoustic wave propagation can also indicate the direction of the slug flow in the wellbore 105. According to the waterfall plot, the velocity of the slugs can also be calculated from the slope of high power noise in space-time coordinates for a specific frequency range.

Pattern Recognition (Algorithm #11):

This Algorithm #11 is referred to as "Pattern Recognition" at 585 of FIG. 5. This algorithm uses acoustic and temperature patterns library (at 570 of 500) to estimate the steam injection flow profile from acoustic surveillance data and temperature profiles.

Figure 15A:
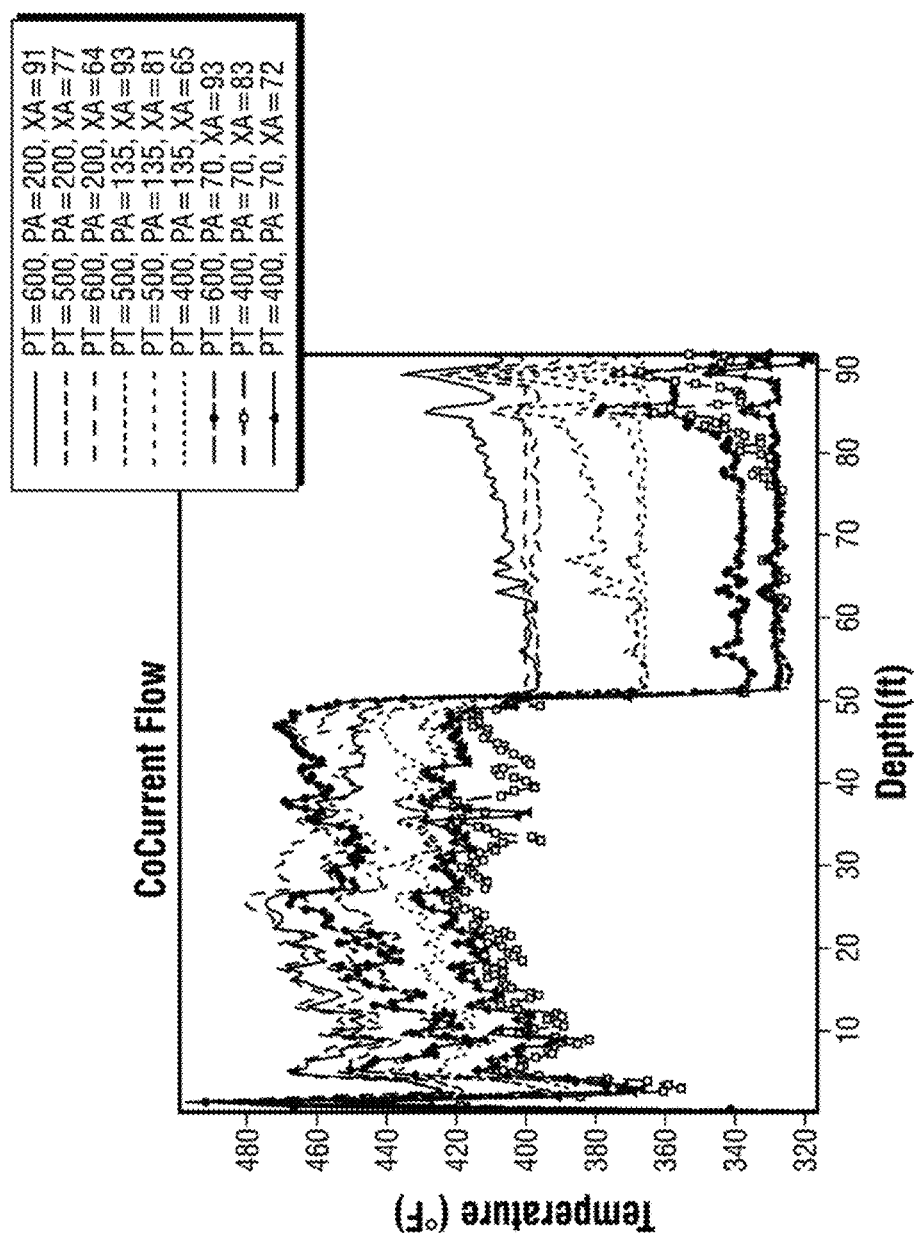
FIGS. 15A-15B illustrate example temperature patterns from the horizontal steam injection test facility of FIGS. 4A-1, 4A-2, and 4B for the co-current and counter-current flow respectively.
Figure 15B:
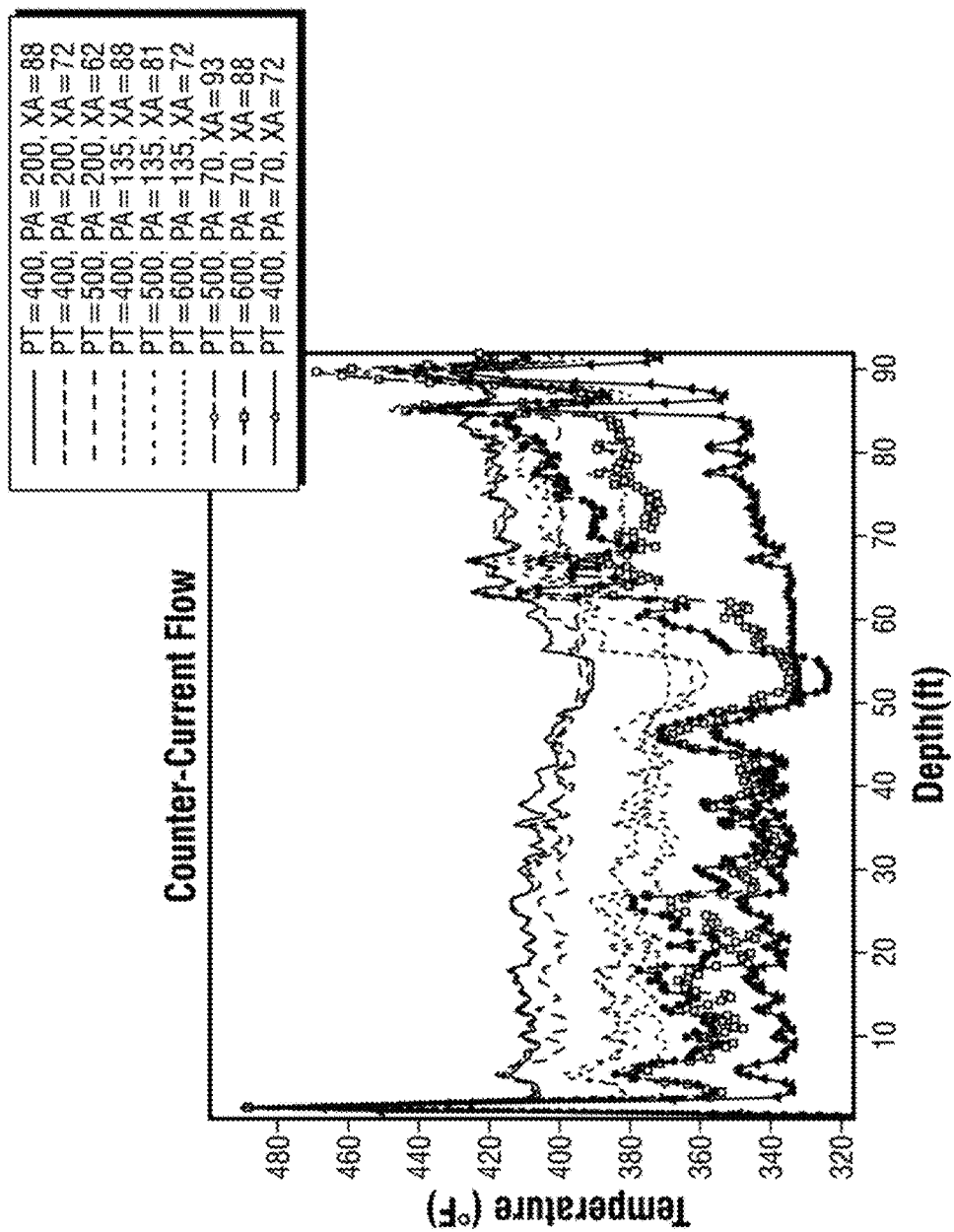

FIGS. 15A-15B illustrate example temperature patterns from HSITF 400 for the co-current and counter-current flow respectively. For example, FIG. 4B illustrates the test section and fiber optic installation. In co-current flow tests, valve 1 is open and valve 2 is closed, and in counter-current flow tests valve 2 is open and valve 1 is closed. Thus, in co-current tests, the steam flows in annulus and tubing are in the same direction. In the counter-current flow, the steam flows in the annulus and the tubing are in opposite direction.

As can be seen in FIG. 15A for the co-current flow, the temperature drops sharply at the location of nozzle. However, in the counter-current flow of FIG. 15B, a sudden temperature drop is not observed.

FIGS. 15A and 15B also show slightly temperature increase in the flow direction. At the location of flow control devices, the temperature is the lowest value and it increases along the tubing in the direction of the flow. One of the reasons for this behavior is the steam quality and effective heat transfer change along the flow path. Higher steam quality has a lower convective heat transfer coefficient.

In one embodiment, the flow behavior observation in the test facility can be used for the downhole flow direction analysis from the shape of temperature observation data. A sudden drop of temperature after flow control devices suggests co-current flow in that wellbore segment (FIG. 15A).

Figure 16:
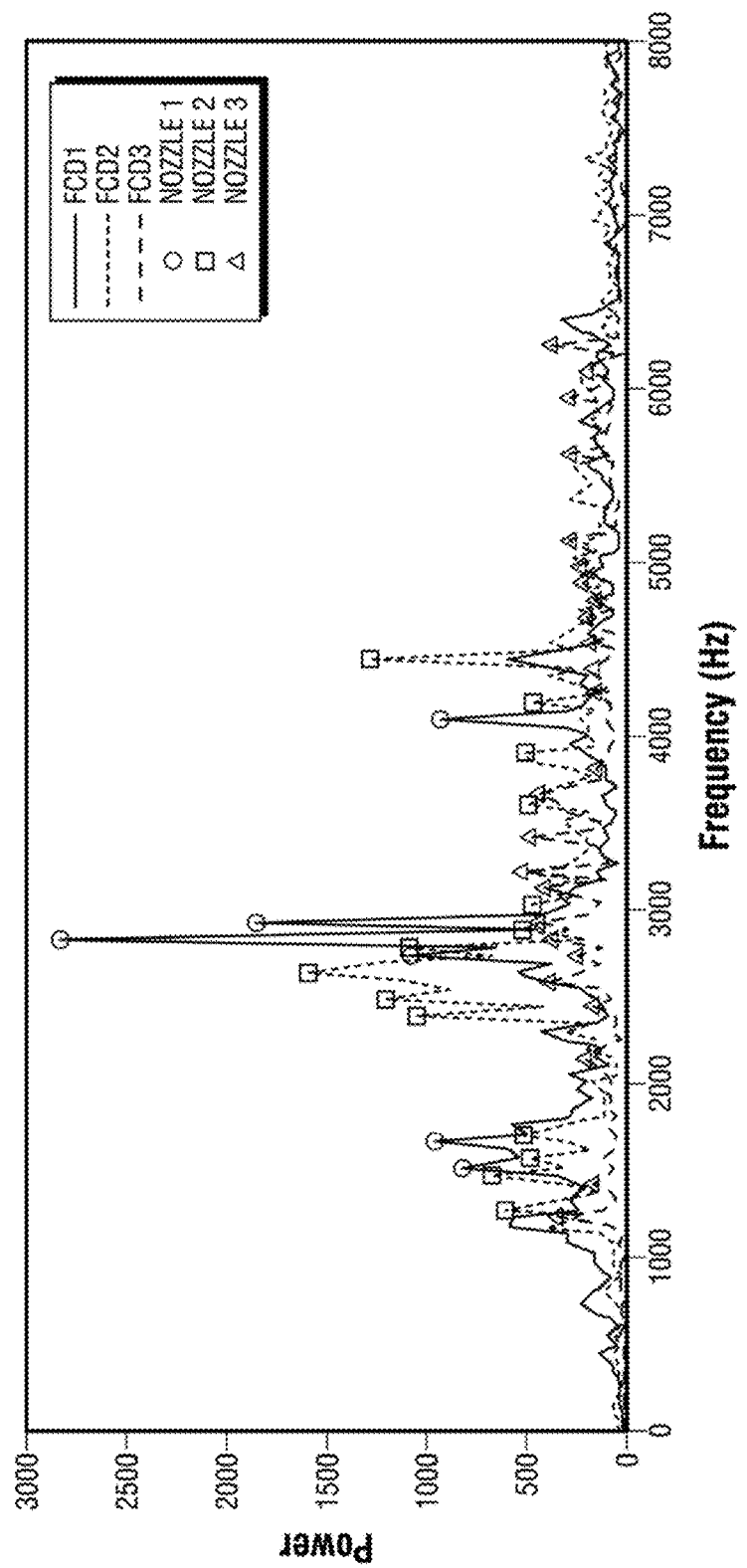
FIG. 16 illustrates a nozzle acoustic characterization pattern for three different nozzles sizes.

FIG. 16 illustrates the nozzle acoustic characterization pattern for three different nozzles sizes. In one embodiment, using unsupervised machine learning techniques, the underlying temperature and acoustic energy patterns for various elements (nozzle, pipe, slotted liner, etc.) are detected.

In FIG. 16, once the acoustic power response in the characteristic frequency range of each flow component (e.g., nozzles, slots, and pipe) and the temperature profile are identified, a proxy model can be "trained" via a machine learning algorithm to find the relationship between the test facility variables and the acoustic and temperature response as a predictor model. In yet another embodiment, inverse modeler from the predictor can be developed to "guess" the input parameters, mainly flow rate, from the output response data (DAS and/or DTS), and optionally with other variables including, but not limited to, pressure measurements. Using the developed predictor and the inverse modeler algorithms, acoustic and temperature data in down-hole condition can be used to predict the flow rates.

Returning to FIG. 5, at 585, a set of computational algorithms is provided. In one embodiment, the set of computational algorithms may comprise a first set of computational algorithms that are used to determine the steam injection flow profile for the steam injection for steady-state time periods (590) and a second set of computational algorithms that are used to determine the steam injection flow profile for the steam injection for transient time periods (595). Alternatively, the computational algorithms do not need to be divided in such categories. However, those of ordinary skill in the art will appreciate that other computational algorithms may also be utilized consistent with the principles of the present invention. Nonetheless, at 585, at least one computational algorithm that is selected may be executed, for example, by the computing system 1700.

Compute Steam Injection Flow Profile

At 600, the steam injection profile may be determined, for example, it may be computed by the computing system 1700. For example, at 600, results from each executed computational algorithm and the associated weight may be used to determine the steam injection flow profile (sometimes referred to as final flow profile or final solution herein).

In one embodiment, the steam injection flow profile is computed from multiple independent algorithms using the following equation.

$$f = \frac{1}{\sum_{i=1}^{N} w_i} \sum_{i=1}^{N} w_i f_i \qquad \text{Eq. 5}$$

where f is the steam injection flow profile (a vector of percentage of the flow along the well in several segments), $w_i$ is the weight factor of each computational algorithm, which can be pre-defined or automatically calculated based on the cluster theory, $f_i$ is the steam injection flow profile results from algorithm i. weights ($w_i$) can be calculated from sensitivity analysis, flow diagnostics or automatic mathematical theories such as cluster analysis. One computational algorithm may have a higher weight than other.

In one embodiment, the Euclidean distance of the computational algorithms is used to find the clusters of solutions. The inverse average Euclidean distance of the solutions is used as the weight factor estimation. In another embodiment, the solution confidence criteria are calculated based on various statistical parameters and solution cluster distance. If a good cluster with close Euclidean distance compared to maximum distance of $\sqrt{2}$ was obtained (assuming the summation of solution as the fraction of steam distribution is one) the confidence in final steam injection flow profile is high, otherwise the confidence is low.

In one embodiment, the final solution may be calculated using the computational algorithms that have historically been more accurate. In yet another embodiment, an expert user may confirm the final solution (i.e., the steam injection profile), provide input to the computing system for the computing system to determine the final solution, or any combination thereof, as in 610 of the method 500. In some embodiments, optional reservoir TOW observation, non-fiber optic surveillance data, expert user input, etc. are used to select the most appropriate algorithms results and weights to generate steam injection flow profile with high confidence value.

Nonetheless, at 600, the steam injection flow profile may be determined by the computing system 1700. Furthermore, a confidence value may be determined for the steam injection flow profile, for example, determined by the computing system 1700 using standard deviation, number of solutions, etc. Furthermore, effectiveness of steam injection conformance may be calculated (e.g., by the computing system 1700) using coefficient of variation and/or coefficient of skewness. Those of ordinary skill in the art will appreciate that various options are available for determining the steam injection flow profile.

FIG. 6 illustrates one example steam injection flow profile. FIG. 6 assumes that the wellbore has five wellbore segments. As illustrated, various computational algorithms were selected and executed to generate percentages. For example, execution by the computing system 1700 of the steady state thermal hydraulic model algorithm produced a result of 20% for the wellbore segment #1, a result of 16% for the wellbore segment #2, and so on. On the other hand, execution by the computing system 1700 of the early transient cooling DTS algorithm produced a result of 14% for the wellbore segment #1, a result of 10% for the wellbore segment #2, and so on. The steam injection flow profile was determined by using the results of these executed algorithms and the associated weight of the algorithm (illustrated in the last column). As illustrated, the steam injection flow profile includes a value for each wellbore segment, namely, 15% for wellbore segment #1, 15% for wellbore segment #2, 16% for wellbore segment #3, 21% for wellbore segment #4, and 33% for wellbore segment #5. The confidence value for this steam injection flow profile is 93%, the coefficient of variation is 19%, and the coefficient of skewness is −0.13.

Due to the high confidence of this determined steam injection flow profile, an engineer may be inclined to make the decision to take corrective action regarding wellbore segment #5 because it appears that wellbore segment #5 is receiving a lot more steam (33%) than the other wellbore segments (15%-21%). In other words, the steam injection flow profile has highlighted a non-uniform steam injection and corrective action may be taken (e.g., installing packers, installing or changing flow control devices, workover, etc.) to make the steam distribution more uniform across the wellbore segments. The corrective action may in turn lead to more uniform heating across the wellbore segments and may increase recovery of heavy oil.

Analysis Reports

At 612 of the method 500, the analysis may be reported. In one embodiment, the following information may be reported or form the basis of a report a) the steam injection flow rate in the horizontal lateral section, b) the steam quality profile, c) pressure and temperature profiles in the annulus and tubing, d) percentage of the steam injection from each wellbore segment into the formation, e) the determined steam injection flow rate profile, f) the confidence level of the steam injection flow profile, g). the coefficient of variation of the steam injection flow profile, h) the coefficient of skewness of the steam injection flow profile, i) any combination thereof, etc. Diagnostic information about the wellbore and near wellbore, such as cavity around the liner, short circuits, plugging, formation pressure and saturation, flow control devices performance, and flow regimes may be other key analysis results. The report may be output using the computing system 1700.

Corrective Action Remediation and Optimization

As discussed herein, corrective action may be taken to improve the distribution of steam and heat. For example, the corrective action may be based on the determined steam injection flow profile, as discussed with FIG. 6. Thus, at 615 of the method 500, a remediation and optimization report for the effectiveness of steam injection, heat management, and well production response may be generated, for example, the computing system 1700.

Hardware and Software

For the purposes of this specification and appended claims, various analysis and/or analytical components may be used, including digital and/or analog systems. The computing system 1700 may have components such as a processor or processing unit, storage media, memory, input, output, communications link (wired, wireless, pulsed mud, optical or other), user interfaces, software programs, signal processors (digital or analog), and other such components (such as resistors, capacitors, inductors and others) to provide for operation and analyzes of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis, and other functions deemed relevant by a system designer, owner, user or other such personnel, in addition to the functions described in this disclosure. In short, practically computing system (e.g., computer, laptop, desktop, portable device, smartphone, tablet, etc.) may be utilized or customized. Further, various other components may be included and called upon for providing aspects of the teachings herein. For example, a power supply, a steam generator, a steam injection system, a fiber optic surveillance system, an optical fiber, HSITF, wellbore components, a downhole pressure measurement device, downhole temperature measurement device, a sensor, a transmitter, a receiver, a transceiver, a controller, an optical unit, etc. may be included in support of the various aspects discussed herein or in support of other functions beyond this disclosure.

Figure 17:
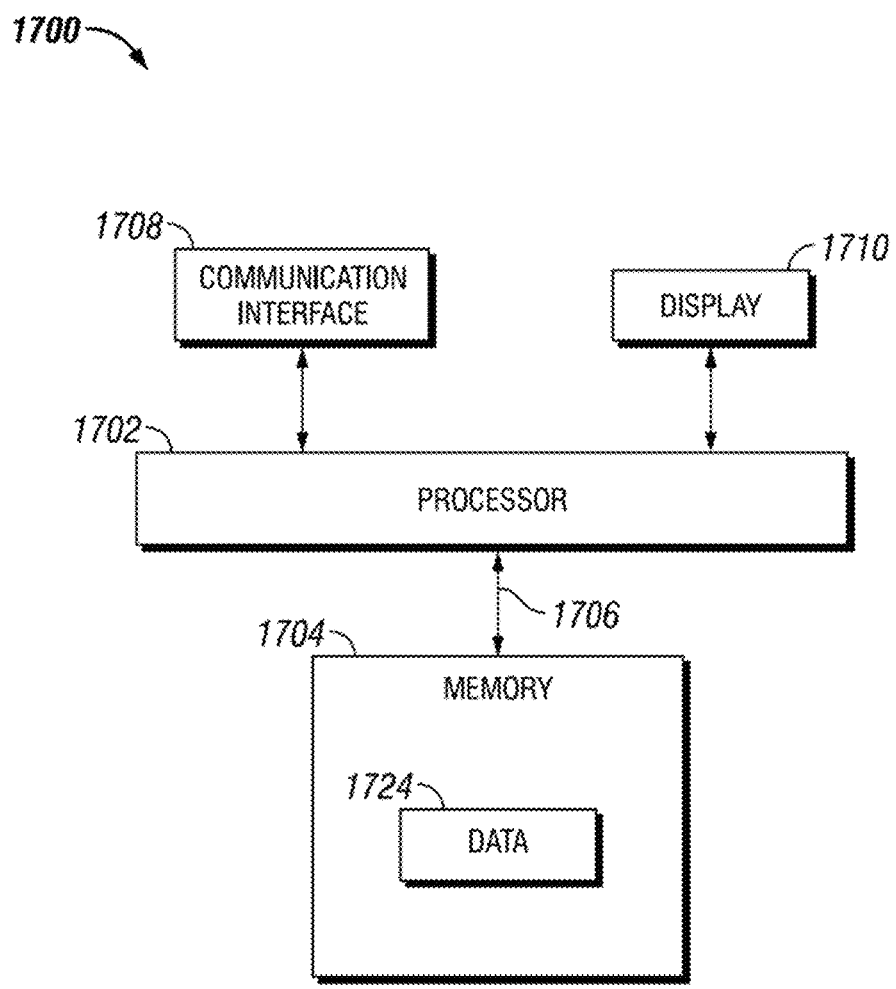
FIG. 17 illustrates one embodiment of a computing system useable to perform steam injection flow profiling.

In one embodiment, referring now to the accompanying FIG. 17, an example computing system 1700 useable to perform steam injection flow profiling is disclosed. In particular, the example computing system 1700 can be used to determine a steam injection flow profile. One example of a steam injection flow profile is provided in FIG. 6.

To do so, the computing system 1700 may receive and integrate data 1724, for example, data from a plurality of data streams, data from different sources (e.g., a hydrocarbon production facility (e.g., an oil field), a steam injection system, a fiber optic surveillance system, HSITF, a downhole pressure measurement device, downhole temperature measurement device, TOW, other devices or components, a user (e.g. engineer), a vendor, etc.), data of different types, etc. Various data options are discussed herein, such as flow diagnostic results, acoustic surveillance data, temperature surveillance data, surface injection data, downhole pressure measurement device data, downhole temperature measurement device data, flow loop data, non-fiber optics surveillance data, any combination thereof, etc. Some data may be determined by the computing system 1700, such as annular temperature data, tubing temperature data, behind liner temperature data, any combination thereof, etc. As illustrated in the embodiments provided herein, the computing system 1700 receives data from at least one source.

The computing system 1700 includes a processor or processing unit 1702 communicatively connected to a memory 1704 via a data bus 1706. The processor 1702 can be any of a variety of types of programmable circuits capable of executing computer-readable instructions to perform various tasks, such as mathematical and communication tasks. The memory 1704 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In some embodiments, the memory 1704 stores a steam injection flow profiling application, discussed in further detail below, for executing, for example, the method 500 of FIG. 5.

The computing system 1700 can also include a communication interface 1708 configured to receive and transmit data, for example, to receive data directly from a fiber optic surveillance system or receive data from a vendor operating the fiber optic surveillance system, etc. Additionally, a display 1710 can be used for presenting a graphical display of the steam injection flow profiling application, viewing and editing of settings (e.g., including settings defining thresholds, parameters, conditions, etc.), etc. Other types of viewing and editing operations, such as viewing and editing of stored data, viewing reports that include the steam injection flow profiles that are determined by the computing system 1700, etc. may be possible as well. The display 1704 may also be used for presenting a user interface associated with the steam injection flow profiling application. In various embodiments, the computing system 1700 can include additional components, such as peripheral I/O devices, for example to allow a user to interact with the user interfaces generated by the steam injection flow profiling application.

In various embodiments, the steam injection flow profiling application may include a data reception component. For example, the data reception component may receive a dataset of temperature surveillance data, acoustic surveillance data, surface injection data, downhole pressure measurement device data, downhole temperature measurement device data, or any combination thereof for steam injection in a well. The temperature surveillance data and the acoustic surveillance data are derived from a fiber optic surveillance system in the wellbore. In some embodiments, the data reception component can also include the collection criteria and/or data quality criteria operations of the method 500. Thus, the data reception component may include 505, 510, 515, 520, 525 of the method 500.

In various embodiments, the steam injection flow profiling application may include a data clean up component (e.g., for 530, 535, 540, 545 of the method 500). In various embodiments, the steam injection flow profiling application may include a separation reception component. The separation component may include determining annular temperature data, tubing temperature data, behind liner temperature data, or any combination thereof from the dataset based on configuration of the fiber optic surveillance system in the well and design of the well. Thus, the separation component may include 550, 555, 560 of the method 500.

In various embodiments, the steam injection flow profiling application may include a computational algorithm selection and execution component for using flow diagnostic results based on the dataset, the annular temperature data, the tubing temperature data, flow loop data, non-fiber optics surveillance data, or any combination thereof to select which computational algorithm or computational algorithms from a set of computational algorithms can be used to determine a steam injection flow profile for the steam injection and associating each selected algorithm with a weight. The computational algorithm selection and execution component may also include executing each selected algorithm. Thus, the computational algorithm component may include 565, 570, 575, 585, 590, and 595 of the method 500.

In various embodiments, the steam injection flow profiling application may include a steam injection flow profile determination component for using results from each executed algorithm and the associated weight to determine the steam injection flow profile for the steam injection. Thus, the steam injection flow profile determination component may include 600 and 610 of the method 500.

Referring generally to the systems and methods of FIGS. 1-17, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 1700, above. Computer storage media does not include a carrier wave or other propagated or modulated data signal. In some embodiments, the computer storage media includes at least some tangible features; in many embodiments, the computer storage media includes entirely non-transitory components.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

Moreover, while the invention has been described with reference to various embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It is to be expressly understood, however, that each of the figures is provided for the purpose of illustration and description only and is not intended as a definition of the limits of the present invention. All citations referred herein are expressly incorporated herein by reference.

The invention claimed is:

1. A method for profiling steam injected into a formation, comprising:
    (a) receiving a dataset of temperature surveillance data, acoustic surveillance data, surface injection data, downhole pressure measurement device data, downhole temperature measurement device data, or any combination thereof for steam injection in a well, wherein the temperature surveillance data and the acoustic surveillance data are derived from a fiber optic surveillance system in the well;
    (b) determining annular temperature profiles, tubing temperature profiles, behind liner temperature profiles, or any combination thereof from the dataset based on configuration of the fiber optic surveillance system in the well and design of the well;
    (c) using flow diagnostic results based on the dataset, the annular temperature profiles, the tubing temperature profiles, behind the liner temperature profiles, flow loop data, non-fiber optics surveillance data, or any combination thereof to select which computational algorithm or computational algorithms from a set of computational algorithms can be used to determine a steam injection flow profile for the steam injection and associating each selected algorithm with a weight;
    (d) executing each selected algorithm;
    (e) using results from each executed algorithm and the associated weight to determine the steam injection flow profile for the steam injection; and
    (f) performing a corrective action to the well, the formation, or any combination thereof leading towards different heating of the formation in response to the steam injection flow profile.

2. The method of claim 1, further comprising associating a confidence value with the steam injection flow profile.

3. The method of claim 2, wherein sensitivity analysis is performed to determine the associated weight of at least one selected algorithm, the confidence value of the steam injection flow profile, or any combination thereof.

4. The method of claim 1, further comprising cleaning a portion of the dataset that does not meet a quality criteria using at least one cleanup algorithm.

5. The method of claim 4, wherein the cleanup algorithm comprises a DTS wavelet cleanup algorithm, a DAS SNR cleanup algorithm, a surface injection wavelet cleanup algorithm, or any combination thereof.

6. The method of claim 1, wherein the dataset is collected based on collection criteria from a prior dataset of temperature surveillance data, acoustic surveillance data, surface injection data, downhole pressure measurement device data, downhole temperature measurement device data, or any combination thereof.

7. The method of claim 6, wherein the collection criteria is used to collect the dataset from a prior dataset for stable periods, transient periods, or any combination thereof.

8. The method of claim 1, wherein the well comprises an injection well or a production well undergoing cyclic steam stimulation (CSS).

9. The method of claim 1, wherein the flow loop data includes steam flow acoustic and temperature patterns, heat loss coefficients, pressure differences for steam flow in pipe, nozzle, and slotted liner derived from fiber optic measurements, point measurement devices, or any combination thereof in a flow loop of a test facility.

10. The method of claim 1, wherein the injected steam comprises a mixture of steam and an additive.

11. The method of claim 1, wherein the set of computational algorithms comprises a first set of computational algorithms that are used to determine the steam injection flow profile for the steam injection for steady-state time periods and a second set of computational algorithms that are used to determine the steam injection flow profile for the steam injection for transient time periods.

12. The method of claim 1, wherein the set of computational algorithms comprises a Pressure Gradient Model (Algorithm #2).

13. The method of claim 1, wherein the set of computational algorithms comprises a Flow Path Differential Pressure and Orifice Flow Model (Algorithm #4).

14. The method of claim 1, wherein the set of computational algorithms comprises a Combined Speed of Sound and Temperature Model (Algorithm #9).

15. The method of claim 1, wherein the set of computational algorithms comprises a Pattern Recognition Model (Algorithm #11).

16. The method of claim 1, wherein the set of computational algorithms comprises a combined DTS and DAS Waterfall Analysis (Algorithm#10).

17. The method of claim 1, wherein the set of computational algorithms comprises a Modified Acoustic Signals Frequency and Power Spectral Density Analysis (Algorithm #8).

18. The method of claim 1, wherein the set of computational algorithms comprises a Liner Slots Pressure Differential Model (Algorithm #5).

19. The method of claim 1, wherein the flow diagnostic results identifies the existence of liquid and vapor along the wellbore from temperature profiles.

20. The method of claim 1, wherein the flow diagnostic results comprises assessment of effectiveness of at least one conformance control element of the well based on acoustic surveillance data and temperature profiles.

21. The method of claim 20, wherein the at least one conformance control element comprises a flow control device, isolation packer, liner, tubing, or any combination thereof.

22. The method of claim 1, further comprising calculating effectiveness of flow profile conformance using coefficient of variation and coefficient of skewness.

23. The method of claim 1, wherein the steam injection is a cyclic steam stimulation, and further generating an assessment of effectiveness of at least one injection and production cycle of the cyclic steam stimulation based on acoustic surveillance data and temperature profiles, and wherein the dataset of claim 1 further comprises production data.

24. The method of claim 1, wherein the corrective action comprises (a) installing packers to redirect or shut-off steam, (b) moving, installing, changing, or removing flow control devices, (c) changing nozzles in flow control devices, (d) altering length of a tubing to inject steam to a specified target, (e) changing steam injection rate and quality, (f) using sliding sleeves to open up or shut off steam to some portion of the formation, (g) workover, or any combination thereof.

25. A system comprising:
a processing unit;
a memory communicatively connected to the processing unit, the memory storing instructions which, when executed by the processing unit, cause the system to perform a method of profiling steam injected into a formation, the method comprising:
  (a) receiving a dataset of temperature surveillance data, acoustic surveillance data, surface injection data, downhole pressure measurement device data, downhole temperature measurement device data, or any combination thereof for steam injection in a well, wherein the temperature surveillance data and the acoustic surveillance data are derived from a fiber optic surveillance system in the well;
  (b) determining annular temperature profiles, tubing temperature profiles, behind liner temperature profiles, or any combination thereof from the dataset based on configuration of the fiber optic surveillance system in the well and design of the well;
  (c) using flow diagnostic results based on the dataset, the annular temperature profiles, the tubing temperature profiles, behind the liner temperature profiles, flow loop data, non-fiber optics surveillance data, or any combination thereof to select which computational algorithm or computational algorithms from a set of computational algorithms can be used to determine a steam injection flow profile for the steam injection and associating each selected algorithm with a weight;
  (d) executing each selected algorithm; and
  (e) using results from each executed algorithm and the associated weight to determine the steam injection flow profile for the steam injection; and
packers, flow control devices, nozzles in flow control devices, tubing, sliding sleeves, or any combination thereof for performing a corrective action to the well, the formation, or any combination thereof leading towards different heating of the formation in response to the steam injection flow profile.

26. The system of claim 25, wherein the corrective action comprises (a) installing packers to redirect or shut-off steam, (b) moving, installing, changing, or removing flow control devices, (c) changing nozzles in flow control devices, (d) altering length of a tubing to inject steam to a specified target, (e) changing steam injection rate and quality, (f) using sliding sleeves to open up or shut off steam to some portion of the formation, (g) workover, or any combination thereof.

* * * * *